(12) United States Patent
Koyama et al.

(10) Patent No.: US 8,966,980 B2
(45) Date of Patent: Mar. 3, 2015

(54) EXTERNAL FORCE DETECTING DEVICE AND EXTERNAL FORCE DETECTING SENSOR

(75) Inventors: Mitsuaki Koyama, Sayama (JP); Takeru Mutoh, Sayama (JP); Hiroki Iwai, Sayama (JP); Yoshiaki Amano, Sayama (JP); Ryoichi Ichikawa, Sayama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 416 days.

(21) Appl. No.: 13/374,769

(22) Filed: Jan. 11, 2012

(65) Prior Publication Data

US 2012/0180568 A1    Jul. 19, 2012

(30) Foreign Application Priority Data

Jan. 17, 2011   (JP) ................................. 2011-006894
Mar. 31, 2011   (JP) ................................. 2011-079938
Jun. 29, 2011   (JP) ................................. 2011-144903

(51) Int. Cl.
| | | |
|---|---|---|
| G01H 13/00 | (2006.01) | |
| G01P 15/097 | (2006.01) | |
| G01P 1/02 | (2006.01) | |
| G01P 15/125 | (2006.01) | |
| G01L 1/14 | (2006.01) | |
| G01L 1/16 | (2006.01) | |
| G01P 15/08 | (2006.01) | |

(52) U.S. Cl.
CPC ............... *G01P 15/097* (2013.01); *G01P 1/023* (2013.01); *G01P 15/125* (2013.01); *G01P 2015/0828* (2013.01); *G01P 2015/0871* (2013.01); *G01L 1/142* (2013.01); *G01L 1/162* (2013.01)
USPC ......................................................... 73/579

(58) Field of Classification Search
CPC ..... G01H 13/00; G01N 29/022; G01N 29/036; G01N 29/12
USPC .......................................................... 73/579
See application file for complete search history.

(56) References Cited

U.S. PATENT DOCUMENTS

| | | | | |
|---|---|---|---|---|
| 6,005,275 | A | * | 12/1999 | Shinogi et al. ................. 257/417 |
| 7,239,817 | B2 | * | 7/2007 | Kaneko et al. ................... 399/45 |
| 2003/0183004 | A1 | | 10/2003 | Furukubo et al. |

(Continued)

FOREIGN PATENT DOCUMENTS

| | | |
|---|---|---|
| CN | 1796952 | 7/2006 |
| CN | 101153825 | 4/2008 |
| DE | 195 31 058 | 3/1996 |
| EP | 1 041 717 | 10/2000 |
| JP | 2002-171152 | 6/2002 |

(Continued)

*Primary Examiner* — Hezron E Williams
*Assistant Examiner* — Mark A Shabman
(74) *Attorney, Agent, or Firm* — Jordan and Hamburg LLP

(57) ABSTRACT

A device is provided for a detecting external force applied to piezoelectric piece. A crystal piece is cantilever-supported in a container. Excitation electrodes are formed on an upper face and lower face, respectively. A movable electrode, connected via a lead-out electrode to the excitation electrode, is formed on the lower face side at a front end of the crystal piece. A fixed electrode is provided on a bottom portion of the container to face this movable electrode. The excitation electrode on the upper face side and the fixed electrode are connected to an oscillation circuit. When the crystal piece bends in response to an applied external force, capacitance between the movable electrode and fixed electrode, changes. This capacitance change results in a corresponding change in oscillation frequency of the crystal piece.

14 Claims, 32 Drawing Sheets

(56) References Cited

U.S. PATENT DOCUMENTS

2006/0108995 A1   5/2006   Bu et al.
2007/0279153 A1  12/2007   Ruby
2008/0202239 A1*  8/2008   Fazzio et al. ............... 73/504.18

FOREIGN PATENT DOCUMENTS

| JP | 2006-138852 | 6/2006 |
| JP | 2008-039626 | 2/2008 |
| TW | 201017174   | 5/2010 |

* cited by examiner

B-B
CROSS SECTION

TO DATA PROCESSING UNIT 101

EXTERNAL FORCE DETECTING DEVICE AND EXTERNAL FORCE DETECTING SENSOR

BACKGROUND OF THE INVENTION

1. Field of the Invention

The present invention relates to a technical field for using a piezoelectric piece, for example a crystal piece, to detect the magnitude of external force acting on a piezoelectric piece based on an oscillation frequency, in order to detect external force such as acceleration, pressure, flow speed of fluid, magnetic force or electrostatic force.

2. Description of the Related Art

As external force acting on a system, there are force acting on an object based on acceleration, pressure, flow speed, magnetic force, electrostatic force, and the like, and it is often necessary to measure such external force accurately. For example, in the stage of development of the automobile, there is performed measurement of impact force to seats when the automobile collides with an object. Further, there are demands for checking acceleration of vibrations or the like as accurate as possible in order to check vibration energy and amplitude during an earthquake.

Furthermore, other examples of external force measurement are checking flow speed of liquid or gas accurately and reflecting detection values thereof to a control system, measuring performance of a magnet, and the like.

To perform such measurement, there are demands for high accuracy measurement with a structure as simple as possible.

Patent Document 1 describes that a piezoelectric film is cantilever-supported, the piezoelectric film is deformed by a change in surrounding magnetic force, and an electric current flowing through the piezoelectric film changes.

Further, Patent Document 2 describes that there are provided a capacitive coupling type pressure sensor and a crystal oscillator disposed in a space partitioned from the area where this pressure sensor is disposed, a variable capacitor of the pressure sensor and the crystal oscillator are connected in parallel, and a pressure is detected by a change of an antiresonance point of the crystal oscillator by a change in capacitance in the pressure sensor.

These Patent Documents 1, 2 differ completely in principle from the present invention.

Patent Document 1: Japanese Patent Application Laid-open No. 2006-138852 (paragraph 0021, paragraph 0028)

Patent Document 2: Japanese Patent Application Laid-open No. 2008-39626 (FIG. 1 and FIG. 3)

SUMMARY OF THE INVENTION

The present invention is made under such a background, and an object thereof is to provide an external force detecting device and an external force detecting sensor which are capable of accurately and easily detecting external force applied to a piezoelectric piece.

The present invention is an external force detecting device detecting external force acting on a piezoelectric piece, the device including:

a cantilever piezoelectric piece supported at one end on a base;

one excitation electrode and another excitation electrode provided on one face side and another face side, respectively, of the piezoelectric piece so as to vibrate this piezoelectric piece;

an oscillation circuit connected electrically to the one excitation electrode;

a movable electrode for forming variable capacitor provided in a portion separated from the one end side on the piezoelectric piece and connected electrically to the other excitation electrode;

a fixed electrode provided separately from the piezoelectric piece to face the movable electrode and connected to the oscillation circuit, where capacitance between the fixed electrode and the movable electrode is changed by bending of the piezoelectric piece to thereby form a variable capacitor; and a frequency information detecting unit for detecting a signal as frequency information corresponding to an oscillation frequency of the oscillation circuit, in which an oscillation loop is formed from the oscillation circuit, passing through the one excitation electrode, the other excitation electrode, the movable electrode, and the fixed electrode and returning to the oscillation circuit, and the frequency information detected by the frequency information detecting unit is for evaluating force acting on the piezoelectric piece.

The movable electrode for forming variable capacitor is provided, for example, on the other side of the piezoelectric piece. The movable electrode may be provided on either of the one face side and the other face side of the piezoelectric piece, or be provided on the both sides.

Examples of specific aspects of the present invention will be enumerated.

A structure can be provided in which a first group and a second group are provided, each group being formed of the piezoelectric piece, the excitation electrodes, the movable electrode, and the fixed electrode, oscillation circuits are provided corresponding to the first group and the second group, respectively, and the frequency information detecting unit has a function to obtain a signal corresponding to a difference between an oscillation frequency corresponding to the first group and an oscillation frequency corresponding to the second group. In this structure, the oscillation circuits can also be combined and shared by the first group and the second group. In this case, a switch unit can be provided between the oscillation circuit and loops so that an oscillation loop of the first group and an oscillation loop of the second group are formed alternately.

Further, a structure can be presented in which, assuming that the piezoelectric piece is called a detection piezoelectric piece, a detection piezoelectric piece and a reference piezoelectric piece are provided in a common container, one excitation electrode and another excitation electrode are provided respectively on both faces of the reference piezoelectric piece, and the one excitation electrode and the other excitation electrode are connected to the oscillation circuit so as to oscillate this reference piezoelectric piece, and the frequency information detecting unit is for obtaining a signal corresponding to a difference between an oscillation frequency corresponding to the detection piezoelectric piece and an oscillation frequency corresponding to the reference piezoelectric piece. In this case, the detection piezoelectric piece and the reference piezoelectric piece may be combined and shared.

The structure may be such that the piezoelectric piece is a crystal piece and a crystal axis of a portion where the excitation electrodes are provided and a crystal axis of a portion where the movable electrode is provided are different from each other.

The crystal axes being different from each other may refer to the case where, for example, directions in which the X axis extends are the same but being positive or negative of the X axis are reverse, the case where, for example, an AT-cut crystal and a DT-cut crystal are joined, and the like. Further, the directions in which the X axis extends may be different from each other.

In the present invention, a support part may be provided on the base to support a portion between the excitation electrodes and the movable electrode on the crystal piece, the portion being on a lower face of the piezoelectric piece, so as to prevent bending of the portion where the excitation electrodes are provided when external force is applied to the crystal piece.

The structure may further include on an internal wall part on a side where the fixed electrode is provided in the container, a projecting part allowing a contact of a portion shifted toward one end side from the other end side of the piezoelectric piece to restrict bending of this portion when the piezoelectric piece bends excessively, thereby avoiding collision of the other end of the piezoelectric piece with the inner wall part of the container.

Another invention is an external force detecting sensor for detecting external force acting on a piezoelectric piece based on an oscillation frequency of the piezoelectric piece, the sensor including:

a cantilever piezoelectric piece supported at one end on a base;

one excitation electrode provided on one face side of the piezoelectric piece and connected electrically to an oscillation circuit so as to vibrate this piezoelectric piece;

another excitation electrode provided on another face side of the piezoelectric piece;

a movable electrode for forming variable capacitor provided in a portion separated from the one end side on the piezoelectric piece and connected electrically to the other excitation electrode; and a fixed electrode provided separately from the piezoelectric piece to face the movable electrode and connected to the oscillation circuit, where capacitance between the fixed electrode and the movable electrode is changed by bending of the piezoelectric piece to thereby form a variable capacitor.

In the present invention, when external force is applied to the piezoelectric piece and the piezoelectric piece bends or the degree of bending changes, a distance between the movable electrode on the piezoelectric piece side and the fixed electrode facing this movable electrode changes, capacitance between the both electrodes changes accordingly, and this capacitance change is seen as a change in oscillation frequency of the piezoelectric piece. Even a slight deformation of the crystal piece can be detected as a change in oscillation frequency, and thus external force applied to the piezoelectric piece can be measured with high accuracy and also the device structure is simple.

DETAILED DESCRIPTION OF THE PREFERRED EMBODIMENTS

First Embodiment

Figure 1:
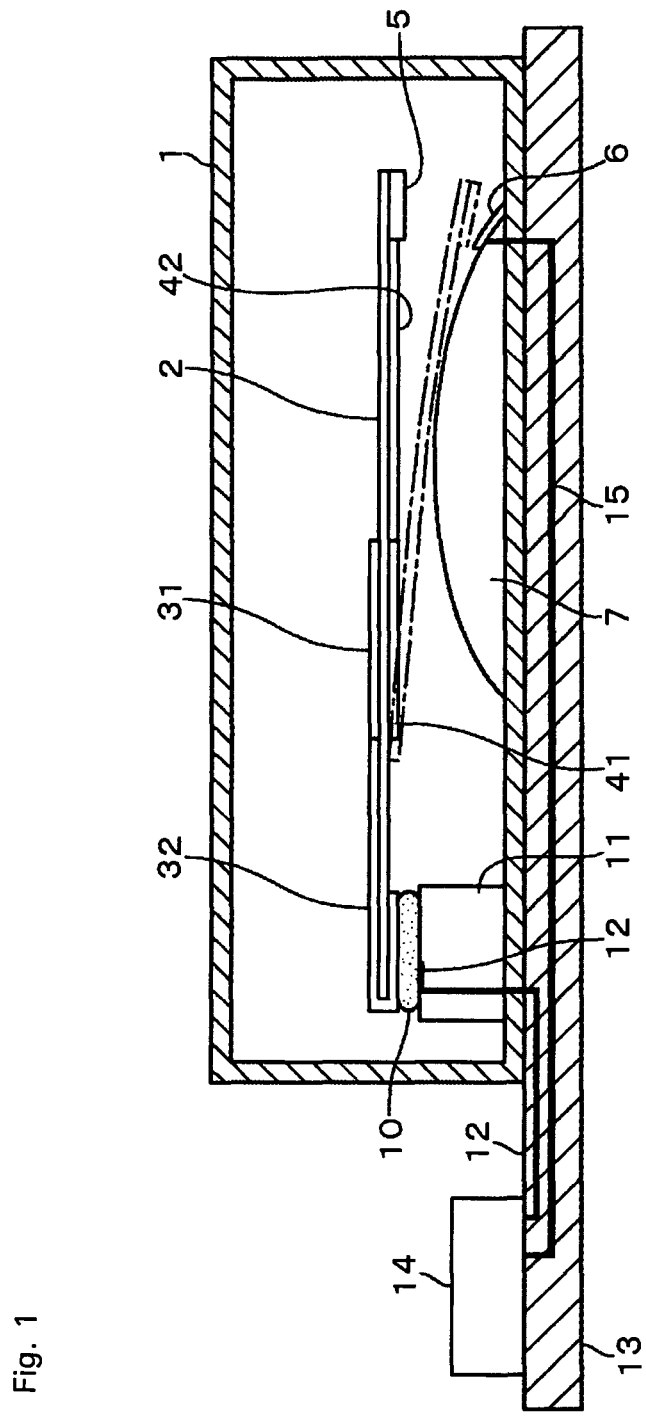
FIG. 1 is a cross-sectional side view illustrating a main part of a first embodiment in which an external force detecting device according to the present invention is applied as an acceleration detecting device.

A first embodiment applying the present invention to an acceleration detecting device will be described. FIG. 1 is a view illustrating an acceleration sensor corresponding to an external force detecting sensor as a sensor part of the acceleration detecting device. In FIG. 1, 1 denotes a sealed container formed of crystal for example in a rectangular parallelepiped shape, in which inert gas, nitrogen gas for example, is sealed. This container is made up of a lower part constituting a base and an upper part joined via a peripheral portion to the lower part. In addition, it is not always necessary to limit the container 1 to a sealed container. In the container 1, a pedestal 11 formed of crystal is provided, and one end of a crystal piece 2 as a piezoelectric piece is fixed to an upper face of this pedestal 11 with a conductive adhesive 10. That is, the crystal piece 2 is cantilever-supported onto the pedestal 11. The crystal piece 2 is formed of, for example, an X-cut crystal in a strip shape and has a thickness being set to, for example, the order of several tens of μm, for example 0.03 mm. Therefore, by applying acceleration to the crystal piece 2 in a direction intersecting therewith, a front end portion thereof bends.

Figure 2:
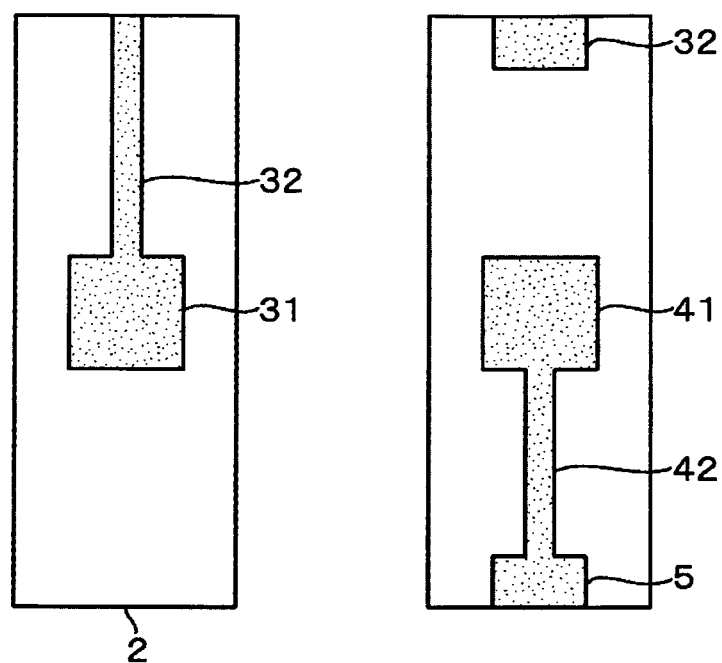
FIG. 2 is a plan view illustrating an upper face and a lower face of a crystal oscillator used in the first embodiment.

On the crystal piece 2, one excitation electrode 31 is provided in a center portion on an upper face of the crystal piece 2 as illustrated in FIG. 2(a), and another excitation electrode 41 is provided in a portion facing the excitation electrode 31 on a lower face of the crystal piece 2 as illustrated in FIG. 2(b), thereby forming a crystal oscillator. A band-shaped lead-out electrode 32 is connected to the excitation electrode 31 on the upper face side, and this lead-out electrode 32 is folded at one end side of the crystal piece 2 to the lower face, thereby contacting the conductive adhesive 10. On the upper face of the pedestal 11, a conductive path 12 formed of a metal layer is provided, and this conductive path 12 is connected via an insulating substrate 13 supporting the container 1 to one end of an oscillation circuit 14 on the insulating substrate 13.

A band-shaped lead-out electrode 42 is connected to the excitation electrode 41 on the lower face side, and this lead-out electrode 42 is led out to another end side (front end side) of the crystal piece 2 and is connected to a movable electrode 5 for forming variable capacitor. On the other hand, a fixed electrode 6 for forming variable capacitor is provided on the container 1 side. A projecting part 7 formed of a convex-shaped crystal is provided on a bottom portion of the container 1. This projecting part 7 has a square shape when seen in a plan view. The present invention is to detect external force via a capacitance change between the movable electrode 5 and the fixed electrode 6 which occurs based on deformation of the crystal piece 2, and thus the movable electrode 5 can be referred to as a detection electrode.

The fixed electrode 6 is provided on this projecting part 7 to substantially face the movable electrode 5. The crystal piece 2 has a nature that when it vibrates excessively and its front end collides with the bottom portion of the container 1, it easily becomes chipped in a crystal mass due to a phenomenon called "cleavage". Accordingly, the shape of the projecting part 7 is decided so that a portion shifted toward a base end side (one end side) of the crystal piece 2 from the movable electrode 5 collides with the projecting part 7 when the crystal piece 2 vibrates excessively. In FIG. 1 and the like, it is depicted in a slightly changed image from the actual device, but when the container 1 is actually vibrated largely, a portion shifted toward the center side from the front end of the crystal piece 2 collides with the projecting part 7.

That is, the projecting part 7 has a role of preventing collision of the front end portion of the crystal piece 2 with an inner wall portion of the container 1 when the crystal piece 2 bends excessively, by allowing a contact of a portion shifted toward the one end side from the front end of the crystal piece 2 to thereby restrict bending of this portion of the crystal piece 2.

Figure 3:
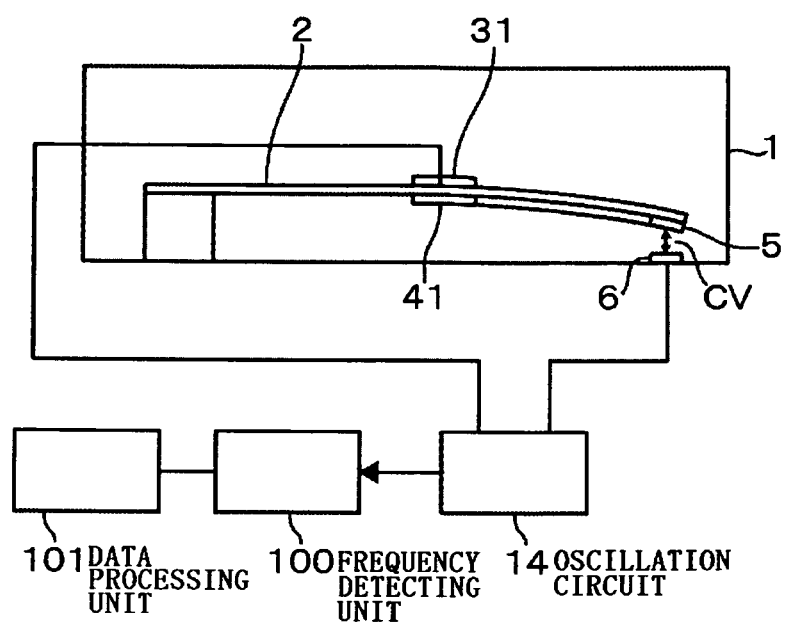
FIG. 3 is a block diagram illustrating a circuit structure of an acceleration detecting device.

The fixed electrode 6 is connected to another end of the oscillation circuit 14 via a conductive path 15 wired via the surface of the projecting part 7 and the insulating substrate 13. FIG. 3 illustrates a connection state of wires of the acceleration sensor. In FIG. 3, 101 denotes a data processing unit formed of a personal computer for example, and this data processing unit 101 has a function to obtain a difference between a frequency f0 when acceleration is not applied to the crystal piece 2 and a frequency f1 when acceleration is applied based on frequency information, for example a frequency, obtained from a frequency detecting unit 100, and obtain acceleration with reference to a data table in which a change amount of frequency calculated from this frequency difference and acceleration are correlated. The frequency information is not limited to the change amount of the frequency difference, but may be the difference in frequency itself.

Figure 4:
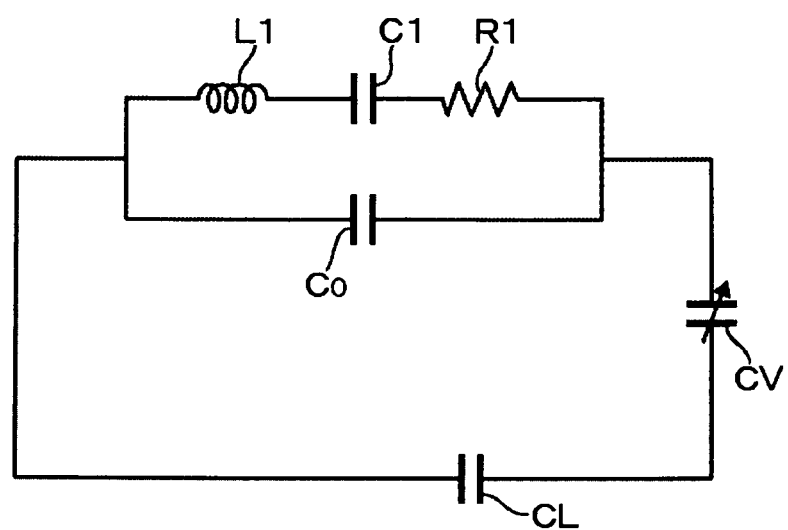
FIG. 4 is a circuit diagram illustrating an equivalent circuit of the acceleration detecting device.

FIG. 4 illustrates an equivalent circuit. In FIG. 4, L1 denotes series inductance corresponding to the mass of the crystal oscillator, C1 denotes series capacitance, R1 denotes a series resistance, and C0 denotes effective parallel capacitance including inter-electrode capacitance. The excitation electrode 31 on the upper face side and the excitation electrode 41 on the lower face side are connected to the oscillation circuit 14, but a variable capacitor Cv formed between the movable electrode 5 and the fixed electrode 6 intervenes between the excitation electrode on the lower face side and the oscillation circuit 14.

A weight may be provided on the front end portion of the crystal piece 2 so as to increase a bending amount when acceleration is applied. In this case, the thickness of the movable electrode 5 may be increased to combine the weight, the weight may be provided separately from the movable electrode 5 on the lower face side of the crystal piece 2, or the weight may be provided on the upper face side of the crystal piece 2.

Here, according to the international standard IEC 60122-1, a general formula of the crystal oscillation circuit is represented as following formula (1).

$$FL = Fr \times (1+x)$$

$$x = (C1/2) \times 1/(C0+CL) \qquad (1)$$

FL is an oscillation frequency when a load is applied to the crystal oscillator, and Fr is a resonance frequency of the crystal oscillator itself.

In this embodiment, as illustrated in FIG. 3 and FIG. 4, total load capacitance of the crystal piece 2 is the sum of the capacitance CL of the load and the capacitance of variable capacitor Cv. Therefore, y represented by formula (2) is substituted for CL in formula (1).

$$y = 1/(1/Cv + 1/CL) \qquad (2)$$

Therefore, when a bending amount of the crystal piece 2 changes from state 1 to state 2, and thereby the variable capacitor Cv changes from Cv1 to Cv2, a change dFL in frequency is represented by formula (3).

$$dFL = FL1 - FL2 = A \times CL^2 \times (Cv2 - Cv1)/(B \times C) \qquad (3)$$

Here, $$A = C1 \times Fr/2,$$

$$B = C0 \times CL + (C0+CL) \times Cv1, \text{ and}$$

$$C = C0 \times CL + (C0+CL) \times Cv2.$$

Further, when a separation distance between the movable electrode 5 and the fixed electrode 6 when no acceleration is applied to the crystal piece 2, so to speak, when it is in a reference state is d1, and the separation distance when acceleration is applied to the crystal piece 2 is d2, following formula (4) holds true. (See FIG. 12).

$$Cv1 = S \times \in /d1$$

$$Cv2 = S \times \in /d2 \quad (4)$$

Here, S is the size of a facing area of the movable electrode 5 and the fixed electrode 6, and $\in$ is a relative dielectric constant.

Since d1 is already known, it can be seen that dFL and d2 are in a correspondence.

The acceleration sensor as a sensor part of such an embodiment is in a state that the crystal piece 2 is slightly bent even in a state that no external force according to acceleration is applied. In addition, whether the crystal piece 2 is in a bent state or a horizontal state is kept is decided depending on the thickness of the crystal piece 2, or the like.

The acceleration sensor having such a structure is used as, for example, an acceleration sensor for detecting horizontal vibrations and an acceleration sensor for detecting vertical vibrations, where the former is installed so that the crystal piece 2 becomes vertical, and the latter is installed so that the crystal piece 2 becomes horizontal.

When an earthquake occurs or simulation vibrations are applied, the crystal piece 2 bends as illustrated by dashed lines in FIG. 1 or as illustrated by solid lines in FIG. 3. When the capacitance between the movable electrode 5 and the fixed electrode 6 is Cv1 in the reference state in which no external force is applied to the crystal piece 2 as already described, the distance between both the electrodes 5, 6 changes when external force is applied to the crystal piece 2 and the crystal piece 2 bends, and thus the capacitance changes from Cv1. Accordingly, the oscillation frequency outputted from the oscillation circuit 14 changes.

Figure 5:
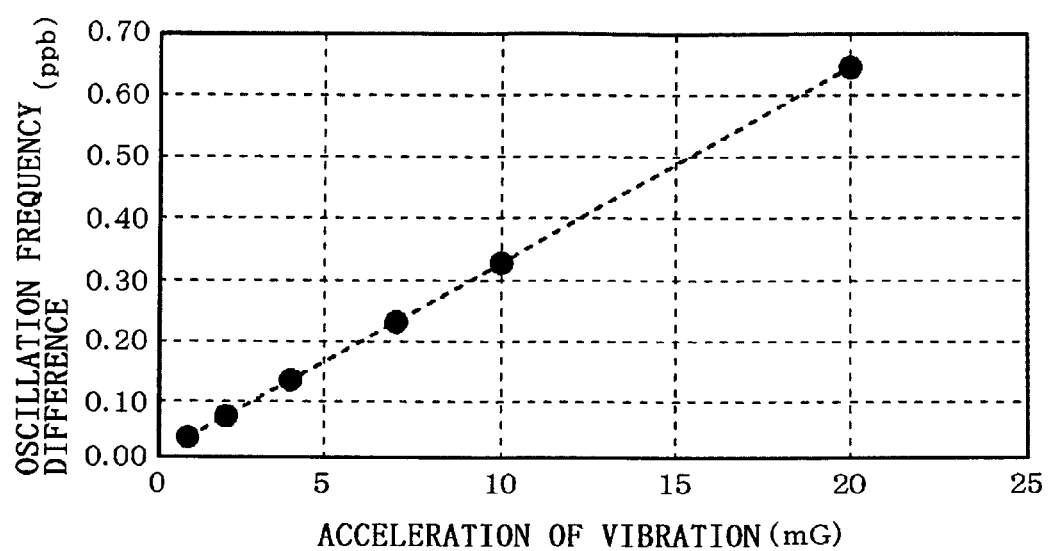
FIG. 5 is a characteristic diagram illustrating the relation between acceleration and a frequency difference obtained using the acceleration detecting device.

When a frequency detected by the frequency detecting unit 100 as a frequency information detecting unit in a state that no vibration is applied is FL1, and a frequency when vibration (acceleration) is applied is FL2, the difference in frequency FL1−FL2 is represented by formula (3). The present inventor calculated the change ratio of frequency in a change from the state 1 to the state 2 from the difference in frequency FL1−FL2, and checked the relation between the change ratio of frequency {(FL1−FL2)/FL1} and acceleration, and thereby obtained the relation illustrated in FIG. 5. Therefore, this proves that acceleration is obtained by measuring the difference in frequency. In addition, with a certain temperature being determined as a reference temperature, the value of FL1 is a frequency value at the reference temperature, for example 25° C.

In the above-described embodiment, external force applied to the crystal piece 2 is seen as a change in oscillation frequency based on a capacitance change between the movable electrode 5 and the fixed electrode 6 by bending of the crystal piece 2. Therefore, a slight deformation of the crystal piece 2 can be detected as a change in oscillation frequency, and thus external force applied to the crystal piece 2 can be measured with high accuracy and also the device structure is simple.

Figure 6:
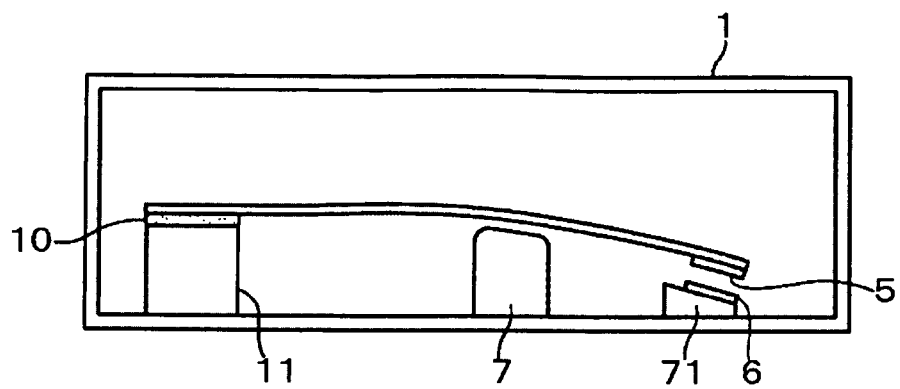
FIG. 6 is a cross-sectional side view illustrating a modification example of the first embodiment.

To prevent the front end of the crystal piece 2 from colliding with the container 1 side, a structure illustrated in FIG. 6 may be employed. In this example, at a position shifted toward the base end side from the movable electrode 5 of the crystal piece 2, there is provided a projecting part 7 which has a square shape having the same width as the crystal piece 2 when seen in a plan view, but has a curved upper face corresponding to a bending shape when force is applied to the crystal piece 2 when seen in a side view. Further, the fixed electrode 6 is provided on a pedestal 71 separated from the projecting part 7.

Figure 7:
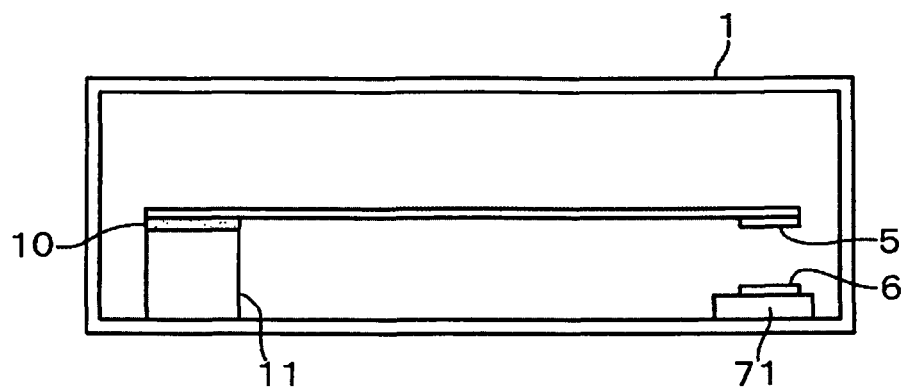
FIG. 7 is a cross-sectional side view illustrating a modification example of the first embodiment.

Further, in the present invention, it is preferred that the projecting part 7 be provided, but a structure without the projecting part 7 as illustrated in FIG. 7 may be employed. Note that the excitation electrodes and so on are omitted in FIG. 6 and FIG. 7.

Second Embodiment

Figure 8:
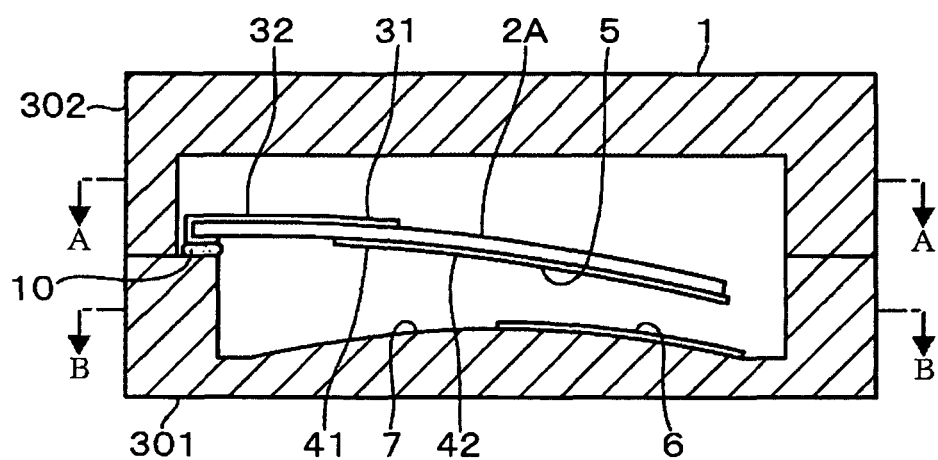
FIG. 8 is a cross-sectional side view illustrating a second embodiment in which the external force detecting device according to the present invention is applied as an acceleration detecting device.
Figure 9:
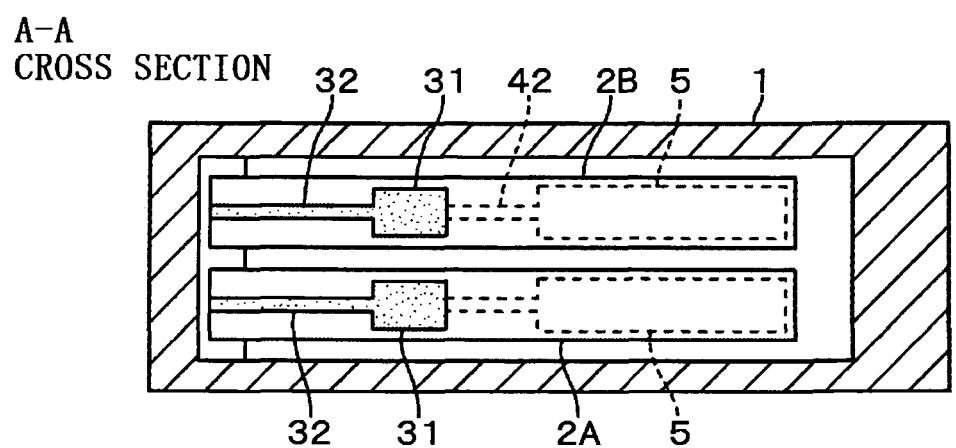
FIG. 9 is a cross-sectional plan view taken along a line A-A in FIG. 8.

Next, a second embodiment applying the present invention to an acceleration sensor will be described with reference to FIG. 8 to FIG. 14, in which like parts are given like numbers. This second embodiment differs from the first embodiment in that there are provided two groups of the crystal piece 2, the excitation electrodes 31, 41, the movable electrode 5, the fixed electrode 6, and the oscillation circuit 14, which are already described. 301 denotes a lower part constituting a base forming a lower side of the container 1, and 302 denotes an upper part constituting a lid forming an upper side of the container 1. Regarding the crystal piece 2 and the oscillation circuit 14, symbol "A" is added to parts of one group, and symbol "B" is added to parts of the other group. In FIG. 8, the crystal piece 2 on one side is illustrated, and the view seen from a side is the same as FIG. 1. When an inner part of the pressure sensor of FIG. 8 is seen in a plan view, a first crystal piece 2A and a second crystal piece 2B are laterally disposed in parallel as illustrated in FIG. 9.

Figure 11:
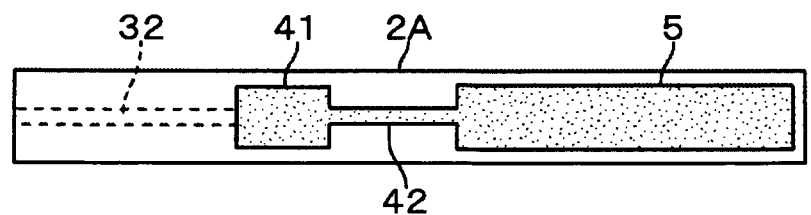
FIG. 11 is a plan view illustrating a rear face side of a crystal oscillator used in the second embodiment.

Since the crystal pieces 2A, 2B have the same structure, the one crystal piece 2A will be described. On one face side (upper face side) of the crystal piece 2A, a lead-out electrode 32 having a small width extends from one end side toward the other end side, and on a front end portion of this lead-out electrode 32, one excitation electrode 31 is formed in a rectangular shape. Then, on another face side (lower face side) of the crystal piece 2A, another excitation electrode 41 is formed facing the one excitation electrode 31 as illustrated in FIG. 9 and FIG. 11, and a lead-out electrode 42 having a narrow width extends toward the front end side of the crystal piece 2 in the excitation electrode 41. Further, on the front end side of this lead-out electrode 42, a movable electrode 5 in a strip shape for forming variable capacitor is formed. The electrode 31 and so on are formed of a conductor film, for example a metal film.

Figure 10:
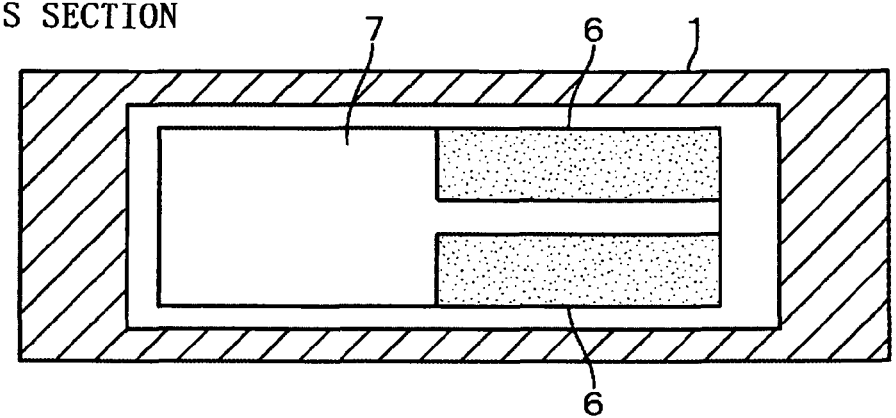
FIG. 10 is a cross-sectional plan view taken along a line B-B in FIG. 8.

On a bottom portion of the container 1, a projecting part 7 formed of a convex-shaped crystal similar to that in FIG. 1 is provided, but a lateral width of the projecting part 7 is set to the size corresponding to the arrangement of the two crystal pieces 2A, 2B. That is, the projecting part 7 is set to a size including a projection area of the two crystal pieces 2A, 2B. Then, as illustrated in FIG. 9 and FIG. 10, on the projecting part 7, a fixed electrode 6 in a strip shape is provided for each of the movable electrode 5 of the crystal piece 2A and the movable electrode 5 of the crystal piece 2B. In addition, in FIG. 8 and so on, the bending shape of the crystal piece 2 is not described accurately since priority is given to easiness in understanding of the structure. However, in the case where it is made with dimensions which will be described later, a portion shifted toward the center side from the front end of the crystal piece 2 collides with the projecting part 7 when the crystal piece 2 vibrates excessively.

Figure 12:
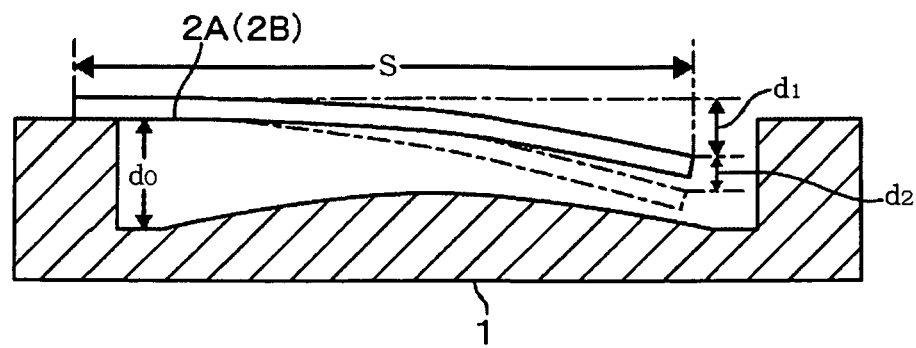
FIG. 12 is a cross-sectional side view illustrating how a crystal piece 2 bends by external force and dimensions of respective parts in the second embodiment.

Regarding the crystal piece 2 and a surrounding area thereof, an example of dimensions of respective parts will be described with reference to FIG. 12. A length dimension S and a width dimension of the crystal piece 2 are 18 mm and 3 mm, respectively. The thickness of the crystal piece 2 is, for example, several μm. Assuming that a support face on the one end side of the crystal piece 2 is set in parallel with a horizontal face, the crystal piece bends by its own weight when it is in a state of being left without applying acceleration, where a bending amount d1 thereof is of the order of 150 μm for example, and a depth d0 of a recessed space in a lower part of the container 1 is 175 μm for example. Further, a height dimension of the projecting part 7 is of the order of 55 μm to 60 μm for example. These dimensions are mere examples.

As examples of preferred dimensions of the crystal piece 2, the length dimension is 15 mm to 25 mm, the width dimension is 1.5 mm to 3.0 mm, and the thickness dimension is 20 μm to 25 μm. The reason that such dimensions are preferred is as follows. The larger the length dimension of the crystal piece 2, the larger the dimensional change of the front end portion, the larger the change in electrostatic capacitance, and the more sensitive it becomes. However, if the length dimension is too large, the bending becomes large and there arises a concern that the movable electrode 5 and the fixed electrode 6 come in contact.

Figure 13:
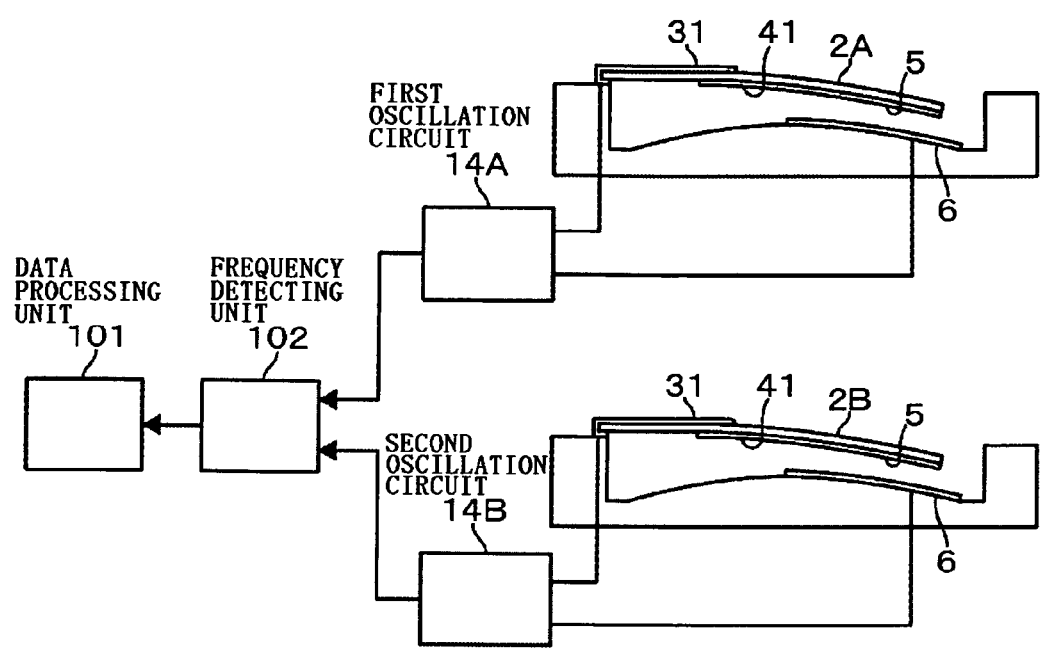
FIG. 13 is a block circuit diagram illustrating a circuit of the acceleration detecting device according to the second embodiment.
Figure 14:
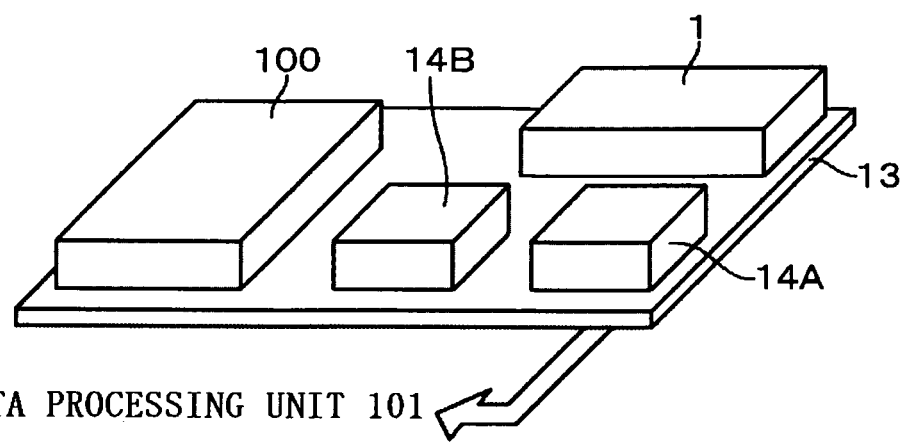
FIG. 14 is an exterior view illustrating an external appearance of a part of the acceleration detecting device according to the second embodiment.

FIG. 13 illustrates a circuit of the acceleration detecting device of the second embodiment. Further, FIG. 14 illustrates an external appearance of a part of the acceleration detecting device. A difference from the first embodiment is that a first oscillation circuit 14A and a second oscillation circuit 14B are connected corresponding to the first crystal piece 2A and the second crystal piece 2B, respectively, and an oscillation loop including the oscillation circuit 14 (14B), the excitation electrodes 31, 41, the movable electrode 5, and the fixed electrode 6 is formed for each of the first crystal piece 2A and the second crystal piece 2B. Outputs from these oscillation circuits 14A, 14B are sent to a frequency information detecting unit 102, where a difference in oscillation frequency or a difference in change rate of frequency from the oscillation circuits 14A, 14B is detected.

The change rate of frequency means as follows. Assuming that the frequency in the reference state in which the crystal piece 2A bends by its own weight is called a reference frequency in the oscillation circuit 14A, the change rate is a value represented by the change amount of frequency/the reference frequency when the crystal piece 2A further bends by acceleration and the frequency changes, and is represented in units of ppb for example. Similarly, the change rate of frequency is also calculated for the crystal piece 2B, and the difference between these change rates is outputted to the data processing unit 101 as information corresponding to frequency. In the data processing unit 101, for example, data in which differences in change rate and magnitudes of acceleration are correlated are stored in a memory, and acceleration can be detected based on these data and a difference in change rate.

In an example of the relation between a bending amount (difference in height level of the front end portion between when the crystal piece is extending straight and when it is bending) of the crystal piece 2A (2B) and a change amount of frequency, if the front end of the crystal piece 2 changes by the order of, for example, $10^{-5}$ μm, the change amount of frequency is 0.65 ppb when the oscillation frequency is 70 MHz. Therefore, even quite small external force, for example acceleration, can be detected accurately.

According to the second embodiment, since the crystal piece 2A and the crystal piece 2B are disposed in the same temperature environment, even when the frequency of each of the crystal piece 2A and the crystal piece 2B changes by temperature, the change amount of this is cancelled, and as a result, only a frequency change amount based on bending of the crystal pieces 2A, 2B can be detected. Thus, there is an effect of high detection accuracy.

Modification Examples of the First Embodiment or the Second Embodiment

Modification examples of the present invention are described in FIG. 15 to FIG. 18.

Figure 15:
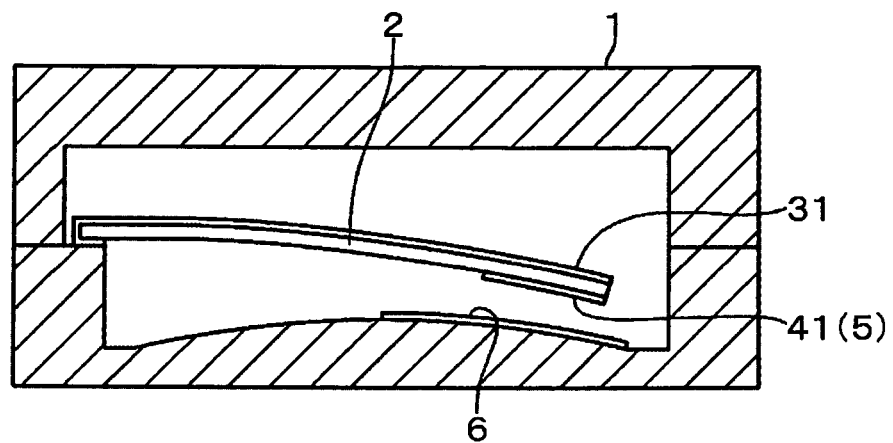
FIG. 15 is a cross-sectional side view illustrating another modification example of the present invention.

In an acceleration sensor illustrated in FIG. 15, the excitation electrodes 31, 41 of the crystal piece 2 are formed on the front end side of the crystal piece 2, and the excitation electrode 41 on the lower face side combines the movable electrode 5.

Figure 16:
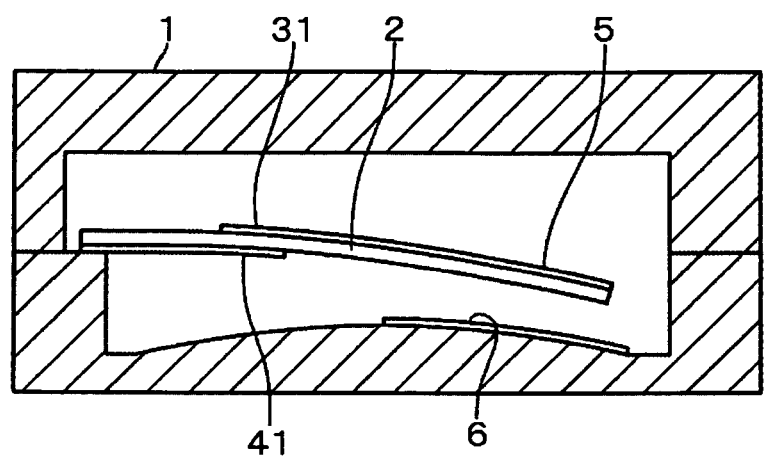
FIG. 16 is a cross-sectional side view illustrating another modification example of the present invention.

An acceleration sensor illustrated in FIG. 16 employs a structure in which the upper face and the lower face of the crystal piece 2A (2B) used in the second embodiment as the crystal oscillator including the crystal piece 2 are reversed. In this case, the crystal piece 2 intervenes between the movable electrode 5 and the fixed electrode 6, but similar operation and effect can be obtained in this structure.

Figure 17:
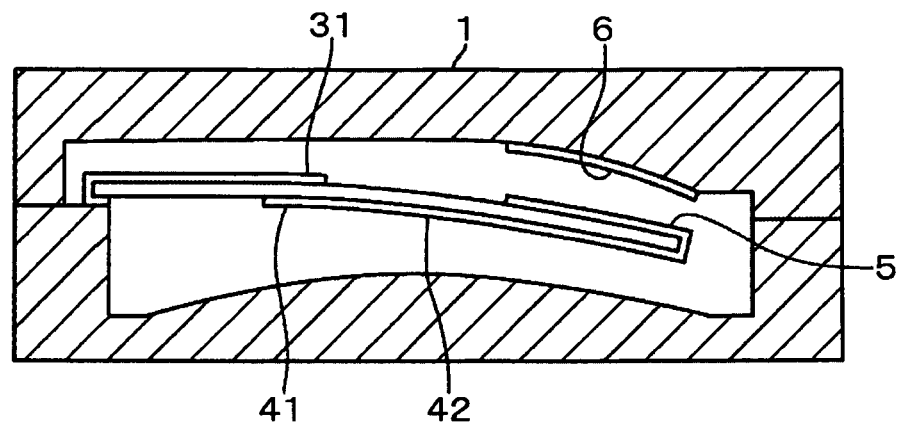
FIG. 17 is a cross-sectional side view illustrating another modification example of the present invention.
Figure 18:
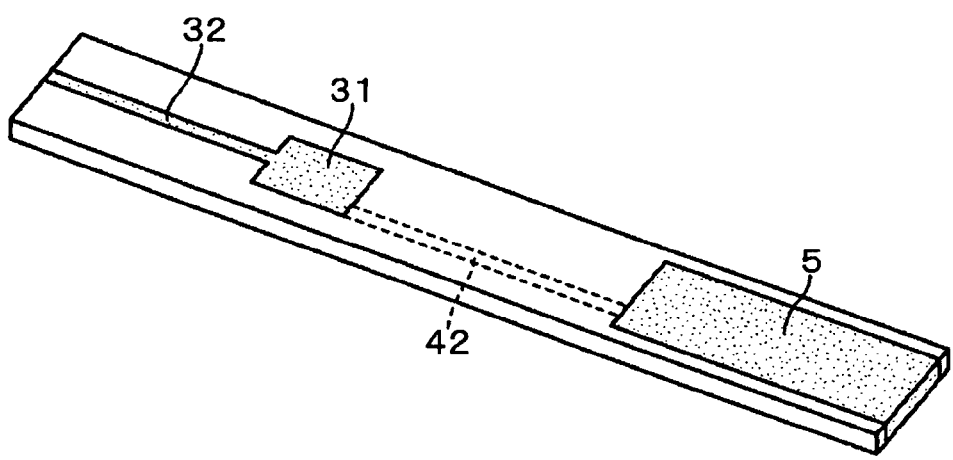
FIG. 18 is a perspective view illustrating a crystal piece used in an acceleration detecting device illustrated in FIG. 17.

An acceleration sensor illustrated in FIG. 17 has a structure in which in the crystal piece 2A (2B) used in the second embodiment the movable electrode 5 on the lower face side is turned around to the upper face side, and the fixed electrode 6 is provided on an inner wall upper face side of the internal space of the container 1 so as to face this movable electrode 5. FIG. 18 illustrates the crystal oscillator of the acceleration sensor illustrated in FIG. 17. Also in this case, similar operation and effect can be obtained.

The modification examples described in FIG. 15 to FIG. 18 may be applied of course as modification examples to the structures of a third embodiment and so on, which will be described later.

Third Embodiment

A third embodiment of the present invention is the same as the second embodiment in that two crystal oscillators are used, but structured such that for one crystal oscillator, the oscillation loop is formed between the excitation electrodes 31, 41 on both faces of the crystal piece 2 and the oscillation circuit without intervention of the variable capacitor. Specifically, in this structure, on the lower side of the crystal piece 2B used in the second embodiment (see FIG. 9), the fixed electrode 6 is not provided, a lead-out electrode is led to one end side (base end side) of the crystal piece 2B from the other excitation electrode 41 of the crystal piece 2B, and the second oscillation circuit 14B is connected electrically to this lead-out electrode.

Figure 19:
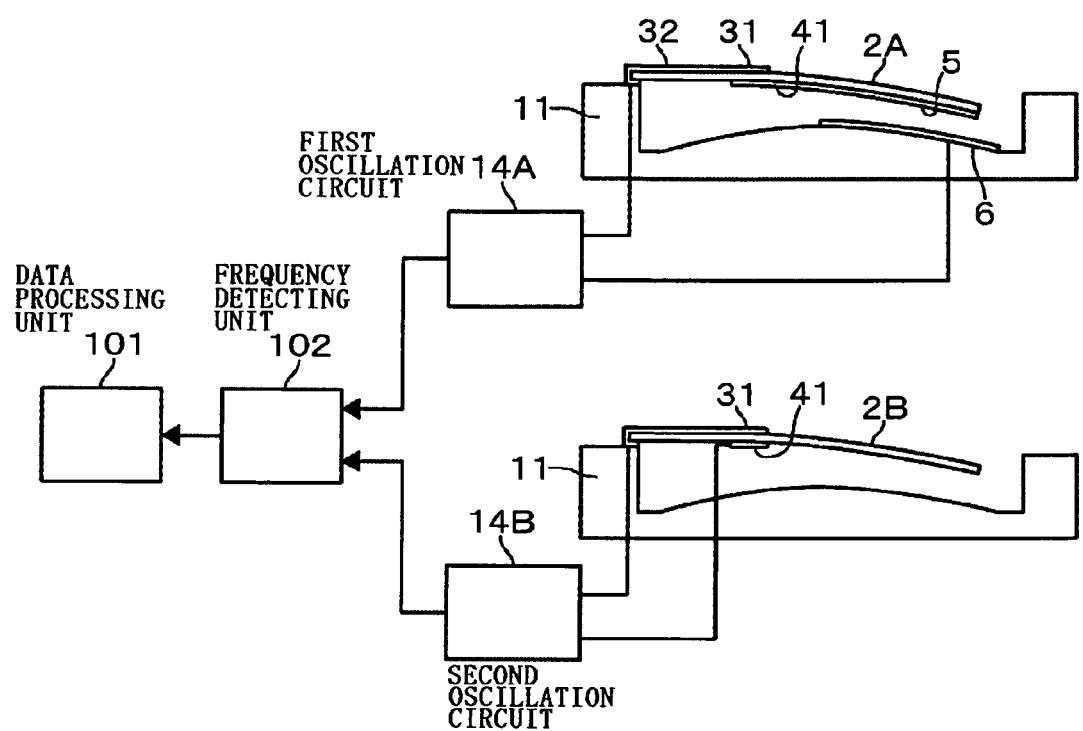
FIG. 19 is a structural diagram illustrating a structure of a crystal oscillator and a block circuit according to a third embodiment.

FIG. 19 is a structural diagram illustrating a block circuit and a structure of the crystal oscillator including the crystal piece 2B in the third embodiment. The lead-out electrode on the lower face side in the second crystal piece 2B is led to a support part 11 and is connected to a conductive path wired in the container 1 via a conductive adhesive in the support part 11, but it is omitted in FIG. 19 for avoiding complication.

Describing in comparison with the second embodiment, a metal film corresponding to the movable electrode 5 may be left, and this metal film may be used as a weight.

According to the third embodiment, since the crystal piece (detection crystal piece) 2A and the crystal piece (detection crystal piece) 2B are disposed in the common container 1, they are disposed in the same temperature environment. Here, it is assumed that acceleration is applied to the crystal piece 2A and thereby the crystal piece 2A bends, and the capacitance (variable capacitor) between the electrodes 5, 6 changes and the frequency of the oscillation frequency (oscillation frequency of the first oscillation circuit 14A) of the crystal oscillator including the crystal piece 2A changes from f1 to f2. f1 is a frequency in a reference state at a reference temperature. The change rate of frequency at this time is (f2−f1)/f1, but the value of this change rate contains a temperature change amount.

On the other hand, when the environmental temperature is deviated from the reference temperature, the frequency of the oscillation frequency (oscillation frequency of the second oscillation circuit 14B) of the crystal oscillator including the crystal piece 2B changes from f1' to f2'. f1, f1' are frequencies in a reference state at a reference temperature (for example, 25° C.). The change rate of frequency at this time is (f2'−f1')/f1', but the value of this change rate contains a temperature change amount.

Therefore, the value of a difference between the change rates of the both,

{(f2−f1)/f1}−{(f2'−f1')/f1'} is cancelled by a change amount of the crystal oscillator by a change in environmental temperature. Thus, acceleration can be measured with higher accuracy by obtaining a relation between this difference value of change rates and a value of acceleration in advance, obtaining a difference value of change rates by the frequency detecting unit 102, and obtaining the magnitude of acceleration from the difference value of change rates in the data processing unit 101.

Modification Examples of the Second Embodiment and the Third Embodiment

Figure 20:
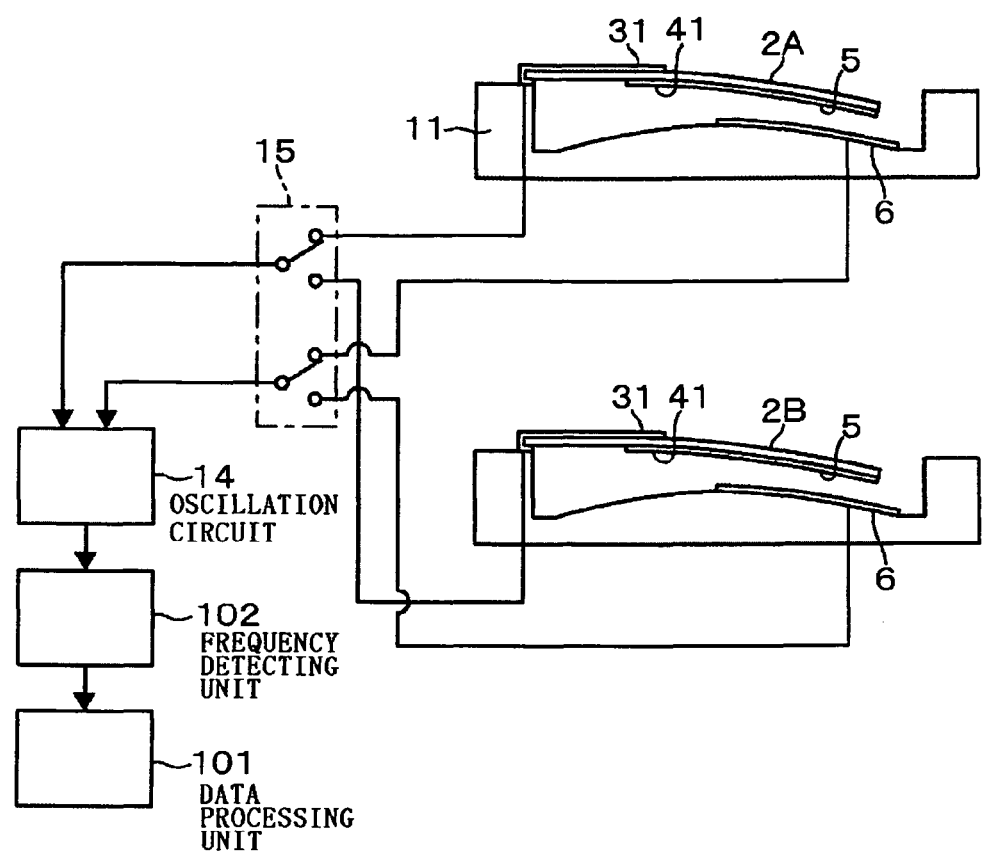
FIG. 20 is a block diagram illustrating a modification example of the second embodiment and the third embodiment.

In the embodiment using the crystal oscillator including the first crystal piece 2A and the crystal oscillator including the second crystal piece 2B, the oscillation circuit 14 may be shared between these crystal oscillators as illustrated in FIG. 20, and one crystal oscillator and the other crystal oscillator may be connected alternately to the oscillation circuit 14 by a switch unit 15 so as to form an oscillation loop. In this case, the oscillation frequency according to the first crystal piece 2A and the oscillation frequency according to the second crystal piece 2B are taken into the frequency detecting unit 102 in a time division manner. The timing of switching of the switch unit 15 can be set such that the oscillation loop is switched at every 100 ms for example. In an initial time when being switched, the oscillation is not stable and thus parameters are set so as to detect the frequency after becoming stable in the frequency detecting unit 102.

Figure 21:
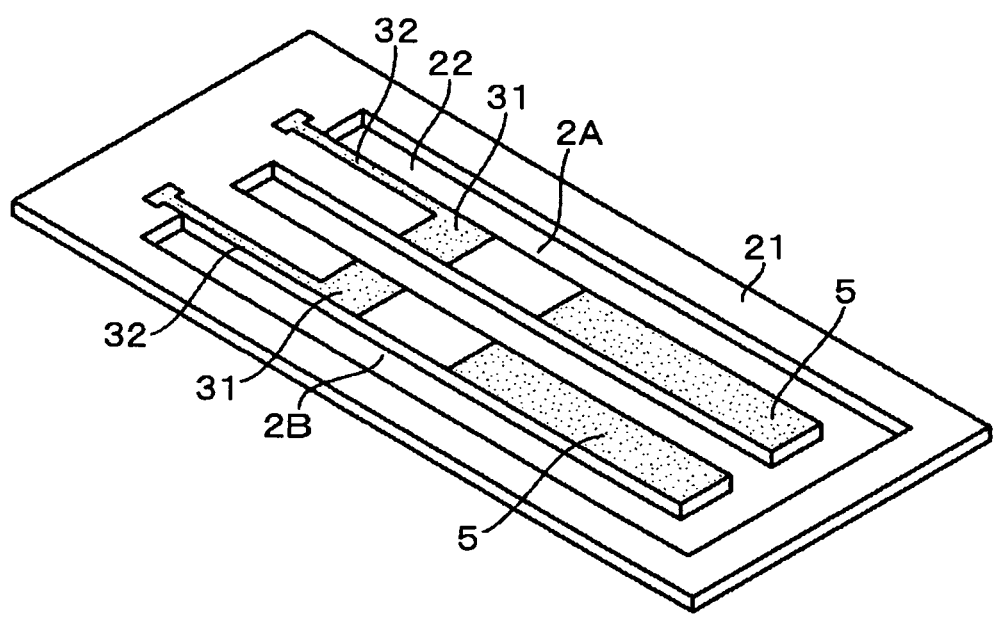
FIG. 21 is a perspective view illustrating another example of a support structure of a crystal piece used in the present invention.
Figure 22:
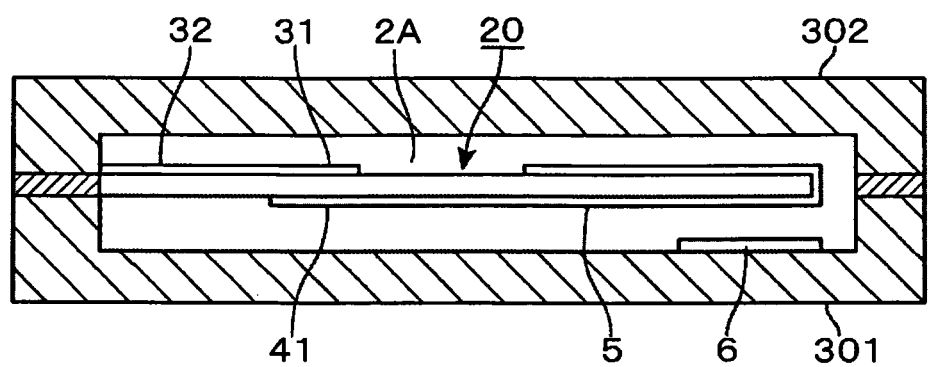
FIG. 22 is a perspective view illustrating another example of the support structure of the crystal piece used in the present invention.

Further, as illustrated in FIG. 21, a structure may be employed in which, for example, a square-shaped crystal plate 20 is etched to make a structure (crystal plate 20) in which a frame part 21, a first crystal piece 2A and a second crystal piece 2B extending in parallel from one side of the frame part 21 are integrated, and as illustrated in FIG. 22, the crystal plate 20 is sandwiched between a lower part 301 and an upper part 302 of a container whose material is crystal to make a three-layer form, where these three layers being bonded to each other. In FIG. 21, 22 denotes a space formed by cutting out. Further, the movable electrode 5 is turned around from the lower face side to the upper face side and is also given a role of weight. As a wiring structure in the frame part 21, a trench is formed to have a depth equivalent to the film thickness of the electrode 32 in a portion where the lead-out electrode 32 is wired in the frame part 21, and the lead-out electrode 32 is led through this trench. Then, a through hole penetrating the frame part 21 and the lower part 301 of the container from a bottom portion of the trench is formed, thereby making a structure such that the wire is lead to the outside via this through hole.

When the crystal pieces 2A, 2B with, so to speak, a frame is made thus, the crystals adhere to each other by stacking three of them for example without any pressurizing in particular, but they may be pressurized. In this case, for example, the fixed electrode 6 is provided on a lower side of the front end portion only in the one crystal piece 2A, and an electrical wiring can be structured as illustrated in FIG. 19.

With the structure described above, there are following advantages compared to the structure of the first embodiment. In the structure of FIG. 1, the separation dimension between the movable electrode 5 and the fixed electrode 6 differs depending on the amount of the conductive adhesive 10, and thus a setting operation of the separation distance is difficult. However, in the structure of FIG. 22, the degree of bending of the crystal pieces 2A, 2B is determined by adjusting the thickness of the crystal plate 20, and the separation distance is determined by this. Thus, the aforementioned setting operation is easy.

Fourth Embodiment

A fourth embodiment is structured such that the crystal axis differs between a portion where the excitation electrodes 31, 41 are provided and a portion where the movable electrode 5 is provided in the crystal piece 2, and the crystal piece 2 is a twin crystal. In an example of such a structure, the portion where the excitation electrodes 31, 41 are provided is formed of an AT-cut crystal piece, and the portion where the movable electrode 5 is provided is formed of a DT-cut crystal piece. In the AT-cut crystal piece and the DT-cut crystal piece, a direction in which the X axis extends is the same when being positive or negative is ignored, but being positive or negative of the X axis is reverse at 180 degrees. That is, the positive direction of the X axis is reverse to each other. In addition, the term DT-cut crystal is used in a sense also including the case where the direction in which the X axis extends is not exactly the same as the case of DT-cut but is a direction approximating to the DT-cut.

Figure 23:
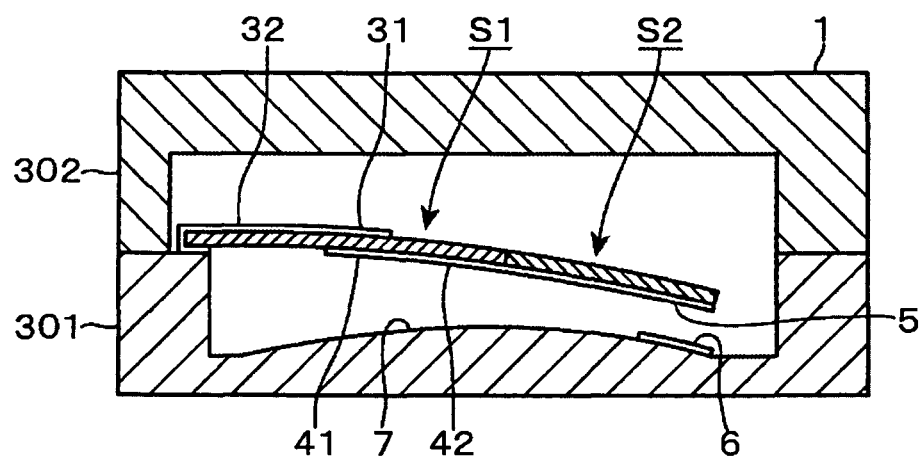
FIG. 23 is a cross-sectional side view illustrating a main part according to a fourth embodiment.

FIG. 23 illustrates a sensor part in this embodiment, and a boundary portion between an AT-cut part and a DT-cut part is located between the front end side of the excitation electrode 31 in the crystal piece 2 and the base end side of the crystal piece 2 in the movable electrode 5 (electrode on the crystal piece 2 side and facing the fixed electrode 6). That is, the base end side of the crystal piece 2 from this boundary portion is, for example, the AT-cut crystal, and the front end side of the crystal piece 2 from the boundary portion is the DT-cut crystal. In FIG. 23, directions of hatchings of the crystal piece 2 are different from each other so as to section the both parts.

Figure 24:
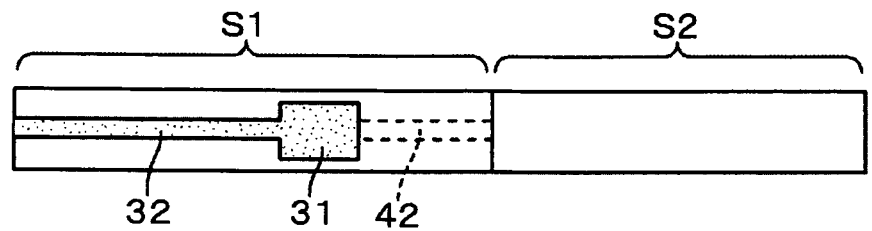
FIG. 24 is a plan view illustrating a crystal oscillator used in the fourth embodiment.

FIG. 24 is a view seeing a crystal oscillator including the crystal piece 2 illustrated in FIG. 23 from above, in which a first crystal portion (for example, AT-cut portion) is denoted by S1, and a second crystal portion (for example, DT-cut portion) is denoted by S2. S1 and S2 differ in crystal axis from each other. The reason for thus forming a twin crystal in the crystal piece 2 is to eliminate a concern that elastic coupling occurs between the crystal portion where the excitation electrodes 31, 41 are provided and the crystal portion where the movable electrode 5 as a detection electrode is provided.

Then, a further effective method for avoiding the elastic coupling is providing an elastic boundary portion between both the crystal portions, and as the structure of this portion, a recessed portion, a hole portion, or a step is formed.

Figure 25:
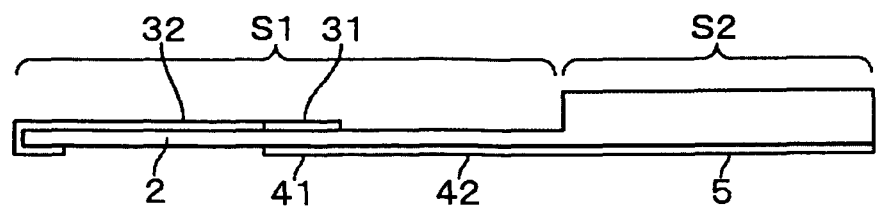
FIG. 25 is a side view illustrating another example of the crystal oscillator used in the fourth embodiment.
Figure 26:
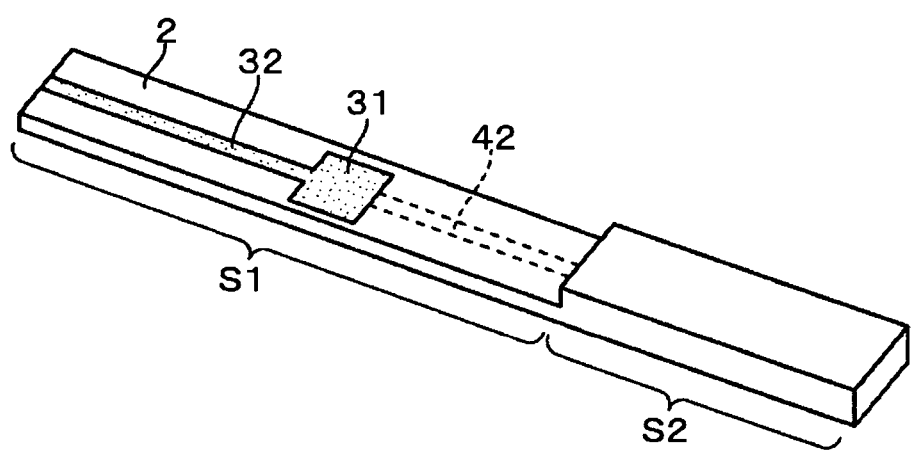
FIG. 26 is a perspective view illustrating another example of the crystal oscillator used in the fourth embodiment.

Among these structures, when the strength of the crystal piece 2 is considered, it can be said that a step is an appropriate structure. Accordingly, as illustrated in FIG. 25 and FIG. 26, it is effective to make the thickness of the crystal piece 2 in the second crystal portion S2 larger than that in the first crystal portion S1. Incidentally, the frequency constant of the AT-cut crystal is 1670 kHz/mm, and the frequency constant of the DT-cut crystal is 2600 kHz/mm. Therefore, when the thicknesses of the both are constant, the resonance frequency fT of the DT-cut crystal is larger than the resonance frequency fS of the AT-cut crystal. Thus, as the thickness of the second crystal portion S2 is made larger than the thickness of the first crystal portion S1, the resonance frequency of the second crystal portion S2 becomes smaller. Thus, there exist thicknesses with which the resonance frequencies of the both become quite close (fS≈fT). Since the frequency temperature characteristic of the DT-cut crystal is a linear expression, there is a concern of elastic coupling when the both frequencies become close. Thus, it is preferred that such a relation of thickness be avoided.

The structure in which the thickness of the front end portion of the crystal piece 2 is large can be said as an advantageous structure because this large thickness portion serves the role of weight. Further, it is also effective in that the already described elastic coupling can be avoided by providing the step in middle of the crystal piece 2. Then, the structure in which the crystal piece 2 is divided into the first crystal portion S1 and the second crystal portion S2 as already described is a further effective approach. However, when such structures, for example, the structured illustrated in FIG. 25 and FIG. 26 are employed, the thickness dimensions are preferably set so that the resonance frequency of the first crystal portion S1 is larger than the resonance frequency of the second crystal portion S2 (fS>fT).

Here, as a method for producing the crystal piece 2 including the twin crystal (crystal having crystal axes different from each other), for example, there is an approach to emit a laser light locally to the AT-cut crystal piece 2 to heat it to about 530° C., and perform local annealing thereon. More specifically, there is an approach to scan an area where it is desired to change AT cut to DT cut in the crystal piece 2 with, for example, a carbon dioxide gas laser having a predetermined spot diameter. When the laser light passes through and heating becomes insufficient, a metal film may be formed on one face side of the crystal piece 2, and the laser may be emitted from the other face side to heat the crystal piece 2 via the metal film. Further, instead of using the laser light having a predetermined spot diameter, a device having a wide emitting area of laser light may be used. In this case, for example in an area other than the area which is desired to be changed to DT cut, for example a stainless mask may be disposed in a state of being slightly floated from the crystal piece.

As an advantage of forming the first crystal portion S1 and the second crystal portion S2 as already described in the crystal piece 2, there is a small concern of occurrence of elastic coupling even when the portion where the excitation electrodes 31, 41 are provided and the portion where the movable electrode 5 is provided have the same thickness. Therefore, a heat treatment process is necessary on the crystal piece 2 for obtaining the twin crystal, but a mechanical processing operation such as making different thicknesses can be dispensed with, thereby simplifying the production processes. On the other hand, since making the thickness of the second crystal portion S2 larger than the thickness of the first crystal portion S1 as illustrated in FIG. 25 is also an effective approach, it may be designed by determining which structure is effective depending on the frequency used, the magnitude of external force as a subject of measurement, and so on. In either case, it can be said that forming the first crystal portion S1 and the second crystal portion S2 is effective compared to the structure having only a single crystal area, and provides large freedom in design and a wide range of selection of structures. In addition, the portion where the excitation electrodes 31, 41 are provided may be the DT-cut crystal, and the portion where the movable electrode 5 is provided may be the AT-cut crystal. As an example of making a structure in which crystal axes are different between the portion where the excitation electrodes 31, 41 are provided and the portion where the movable electrode 5 is provided in the crystal piece 2, the directions in which the X axis extends may be different from each other, that is, a relation of X axes crossing each other.

The structure of the fourth embodiment in which the twin crystal is formed in the crystal piece 2 can be applied to other embodiments, and can be applicable to, for example, the first crystal piece 2A and the second crystal piece 2B used in the second embodiment.

Fifth Embodiment

Figure 27:
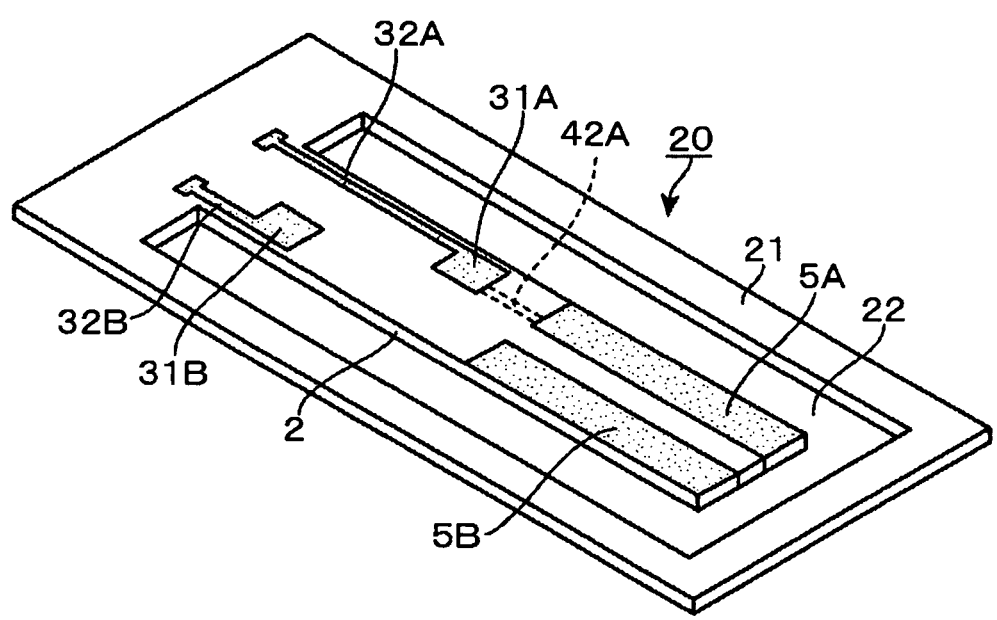
FIG. 27 is a plan view illustrating a crystal oscillator used in a fifth embodiment.

A fifth embodiment can be regarded as a further modification example of the structure illustrated in FIG. 21 as a modification example of the second embodiment and the third embodiment. Structures illustrated in FIG. 27 (top view) and FIG. 28 (bottom view) illustrate crystal pieces 2 used in the fifth embodiment. A difference in the structures from the crystal plate 20 illustrated in FIG. 21 is that it is a structure in which the first crystal piece 2A and the second crystal piece 2B are combined and shared, in other words, a first group including an excitation electrode 31A and a movable electrode 5A and a group including an excitation electrode 31B and a movable electrode 5B are provided in one crystal piece 2. In FIG. 27, the movable electrodes 5A, 5B are formed on the lower face side of the crystal piece 2, but it is illustrated as a structure having the role as a weight by forming the movable electrodes 5A, 5B also on the upper face side, for easiness of understanding the view. In FIG. 27, since there is one crystal piece 2, symbols A, B are added for differentiating the groups of oscillation loops.

A fixed electrode 6 is provided on a lower side of one movable electrode 5A, but the fixed electrode 6 is not provided on a lower side of the other movable electrode 5B. The reason for providing the other movable electrode 5B is that by disposing the movable electrodes 5A, 5B symmetrically with respect to the center in a width direction of the crystal piece 2, a good balance is made in the width direction of the crystal piece 2 and a twist in posture (waving posture) when bending is eliminated, thereby stabilizing change in electrostatic capacitance with respect to the bending amount of the crystal piece 2. Therefore, the other movable electrode 5B can be regarded as a dummy film for balancing, but it is unified by the term "movable electrode" so as to avoid confusion in terms.

Figure 28:
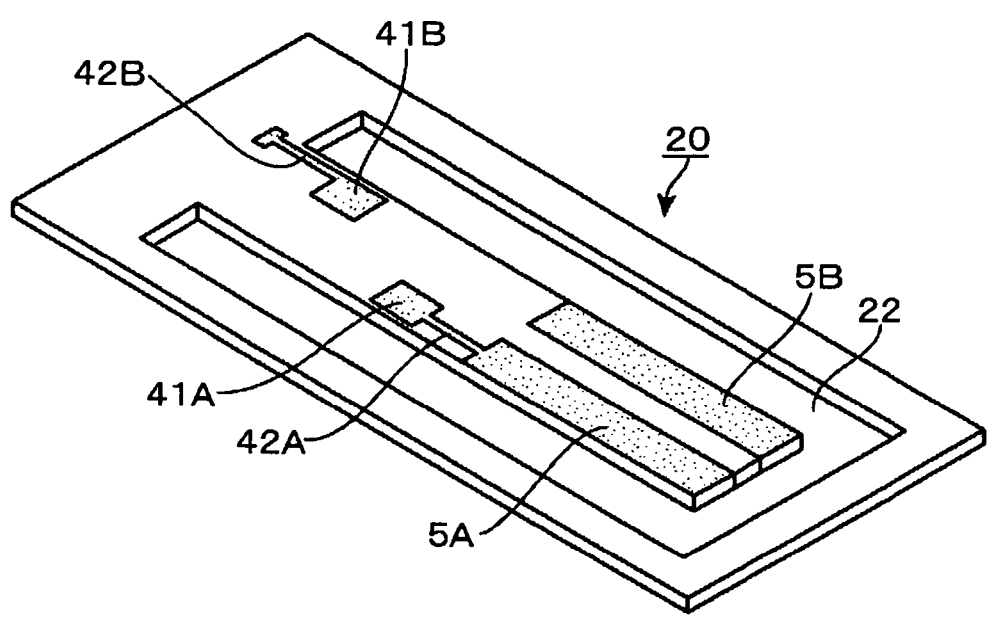
FIG. 28 is a plan view illustrating a state of viewing a crystal plate illustrated in FIG. 27 from a lower side.

Further, as can be seen from FIG. 27 and FIG. 28, an excitation electrode 41A facing the excitation electrode 31A is connected to the movable electrode 5A via a lead-out electrode 42A, but an excitation electrode 41B facing the excitation electrode 31B is not connected to the movable electrode 5B. Wiring in this case is such that, for the first group as illustrated in FIG. 19, an oscillation loop of the oscillation circuit 14A, the excitation electrode 31A, the excitation electrode 41A, the movable electrode 5A, the fixed electrode 6, and the oscillation circuit 14A is formed, but for the second group, an oscillation loop of the oscillation circuit 14B, the excitation electrode 31B, the excitation electrode 41B, and the oscillation circuit 14B is formed. Also in this case, effects similar to those described in the third embodiment are obtained. Furthermore, regarding the width direction of the crystal piece 2, the excitation electrode 31A of the first group and the excitation electrode 31B of the second group are disposed asymmetrically. That is, the positions of the both excitation electrodes 31A, 31B are displaced from each other in a length direction of the crystal piece 2. Accordingly, elastic coupling of vibrations of the first group and vibrations of the second group is securely avoided.

Sixth Embodiment

Figure 29:
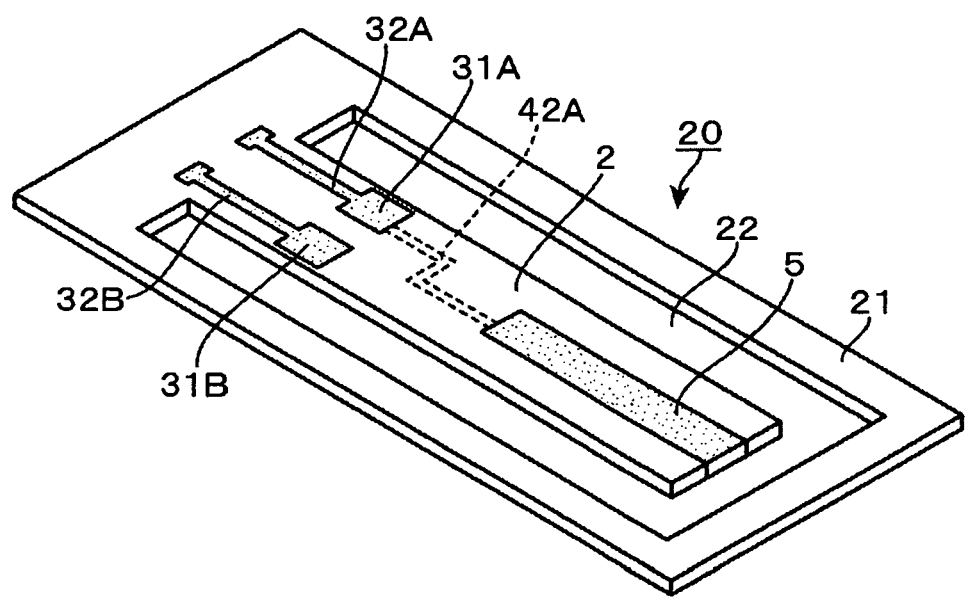
FIG. 29 is a plan view illustrating another example of the crystal oscillator used in the fifth embodiment.

FIG. 29 illustrates a structure of a crystal plate 20 used in a sixth embodiment. In this example, in the crystal plate 20 illustrated in FIG. 27, the movable electrode 5B as a dummy electrode of the second group is omitted, and the movable electrode 5A of the first group is located in a center portion in a width direction of the crystal piece 2A. Regarding a center line in the width direction of the crystal piece 2A, the movable electrode 5A is disposed in a layout distributed equally on a left side and a right side (the width direction is a left and right direction), and therefore, the balance between the left side and the right side of the crystal piece 2 is good, there is no twist in posture when the crystal piece 2 bends, and the change amount of the variable capacitor with respect to the bending amount is stable.

In the fifth embodiment and the sixth embodiment, the structure of the fourth embodiment can also be applied. For example, a structure can be employed in which a boundary portion between a DT-cut crystal portion (or AT-cut crystal portion) formed on the front end side of the crystal piece 2 and an AT-cut crystal portion (or DT-cut crystal portion) formed on a base end side of the crystal piece 2 is located between the excitation electrode 31A and the movable electrode 5.

In the second embodiment to the sixth embodiment, regarding a frequency difference between an oscillation frequency (oscillation frequency between the excitation electrodes 31, 41 or the oscillation frequency between the excitation electrodes 31A, 41A in the crystal piece 2A) f1 of the crystal oscillator for detection corresponding to the first group formed in the crystal piece 2 and an oscillation frequency (oscillation frequency between the excitation electrodes 31, 41 or the oscillation frequency between the excitation electrodes 31B, 41B in the crystal piece 2B) f2 of the crystal oscillator for reference corresponding to the second group, preferably, the absolute value of a ratio of both frequency differences with reference to f1, that is, (f2−f1)/f1 is larger than 100 ppm. In an approach to cancel the frequency change corresponding to a temperature change using the crystal oscillator related to the first group and the crystal oscillator related to the second group, the closer the frequency temperature characteristics of the both, that is, the smaller the frequency difference of the both, the larger the effect thereof. However, when the frequencies are too close, the both of them elastically couple, and the frequency changes from an original frequency. On the other hand, when the frequency difference of the both is large, designing of the digital circuit becomes difficult. Thus, preferably, the ratio of frequency differences is, for example, 3% or smaller.

Seventh Embodiment

This embodiment is an example of supporting a position between a portion having a role as a crystal oscillator and a portion where bending occurs due to external force in the crystal piece 2 with a support member as a support part provided on a lower portion of the container 1 corresponding to a base. That is, a support portion by this support part in the crystal piece 2 is located between the portion where the excitation electrodes 31, 41 are provided and the portion where the movable electrode 5 is provided. Then, preferably, a large distance from the support portion to the front end of the crystal piece 2 is secured so that the degree of bending of the crystal piece 2 when external force is applied to the crystal piece 2 becomes large, that is, high sensitiveness is obtained.

Figure 30:
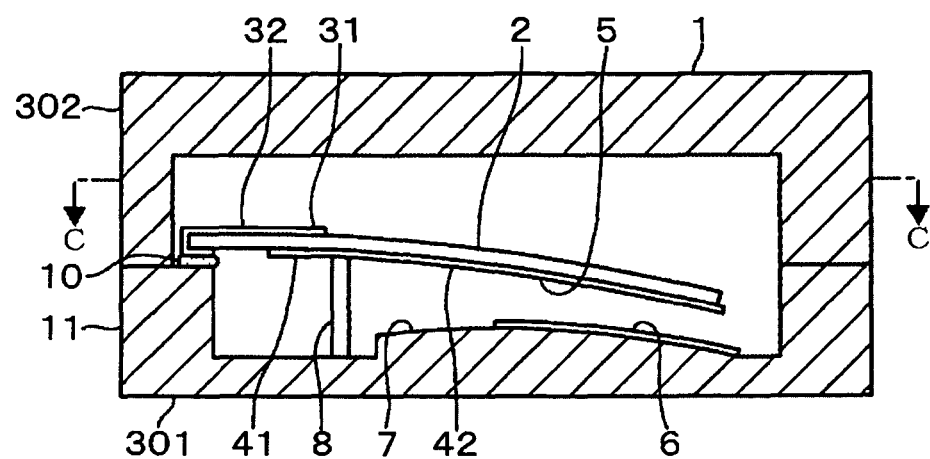
FIG. 30 is a cross-sectional side view illustrating a main part according to a sixth embodiment.
Figure 31:
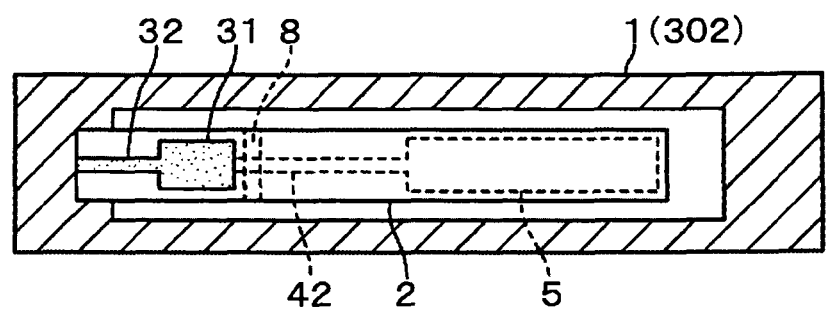
FIG. 31 is a cross-sectional plan view taken along a line C-C in FIG. 30.

Such an example is illustrated in FIG. 30 and FIG. 31. In this example, a square-shaped support part 8 is provided on the bottom portion of the container, and an upper face of this support part 8 supports a portion shifted toward the front end side of the crystal piece 2 by 0.1 mm to several mm for example from the excitation electrode 41 on the lower face of the crystal piece 2. Preferably, a lateral width of the support part 8 is equal to or larger than a width dimension of the crystal piece 2. However, when it is possible to exhibit a function to sufficiently prevent bending of the portion where the excitation electrodes 31, 41 are arranged, it may be smaller than the width dimension of the crystal piece 2. A height dimension of the support part 8 is set to a dimension such that, for example, it contacts the lower face of the crystal piece 2 in a state that the crystal piece 2 extends horizontally from the upper face of the pedestal 11.

In FIG. 30, the structure in the container is described in an exaggerated manner, and thus presents a slightly different image from the structure of an example of an actual external force sensor. As examples of dimensions of the support part 8, the height is 0.5 mm to 1 mm for example, the thickness is 0.3 mm, and the lateral width is 1.6 mm which is the same as the width of the crystal piece 2. These dimensions are examples, and are determined according to the structure of the container 1, the installation position of the crystal piece 2, and the like.

The support part 8 and the lower face (face on the side facing the fixed electrode 6) of the crystal piece 2 are fixed to each other with, for example, a conductive adhesive or a fixing material such as a low dielectric glass. In addition, a structure may be employed in which the support part 8 and the lower face of the crystal piece 2 are not fixed to each other.

As an approach to provide the support part 8, there is an approach to form it by, for example, etching when the lower portion 301 of the container 1 is produced, but the support part 8 may be produced separately from the lower portion 301 and be bonded with an adhesive.

Figure 32:
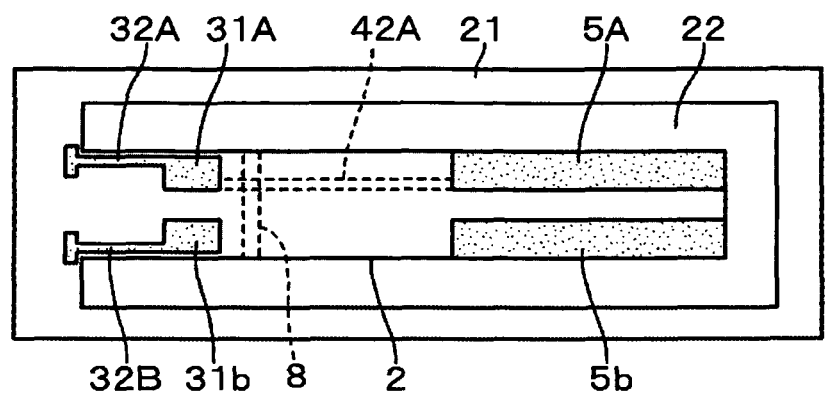
FIG. 32 is a plan view illustrating another example of the sixth embodiment.

Further, the structure using the support part 8 may be applied to the second embodiment or the third embodiment, which is an example of providing two crystal oscillators and obtaining a difference in oscillation frequency of these crystal oscillators, or the like. In this case, the structure is such that, for each of the crystal pieces 2A, 2B (see FIG. 9 for example) of each group, the portion between the excitation electrodes 31, 41 and the movable electrode 5 is supported by the support part 8 as illustrated in FIG. 30 and FIG. 31. The support part 8 may be provided separately for each of the crystal pieces 2A, 2B, or the crystal pieces 2A, 2B may be supported by a common support part 8 extending from a left edge of the crystal piece 2A to a right edge of the crystal piece 2B. A structure is illustrated in FIG. 32 in which the support part 8 is used in the structure of FIG. 27 as an example of using two crystal oscillators.

Here, a sample was created in which the excitation electrode 41 is connected directly to the oscillation circuit in the structure illustrated in FIG. 30, and an oscillation frequency f0 when it is placed on a horizontal surface and an oscillation frequency f10 when it is placed on a surface which is inclined so that the front end side of the crystal piece 2 becomes lower by 10 degrees than the horizontal surface were measured plural times. Values of (f0−f1)/f0 as a change ratio of frequency were 0.1 ppb to 5 ppb.

On the other hand, a similar test was performed on a sample in the case of not providing the support part 8 in the aforementioned sample, and values of (f0−f10)/f0 as a change ratio of frequency were 8 ppb to 45 ppb. From this result, it can be seen that the structure provided with the support part 8 is smaller in ratio of the change amount of frequency due to bending of the vibrating portion (portion where the excitation electrodes 31, 41 are provided) of the crystal piece 2A to the change amount of the oscillation frequency when the crystal piece 2 bends due to external force. This result can be regarded as it is based on that when the front end side of the support part 8 bends in the crystal piece 2, the vibrating portion barely bends due to the existence of the support part 8.

A change in frequency of the vibrating portion is not reproducible, and thus the structure provided with the support part 8 as described above enables to obtain a frequency change which corresponds to bending of the crystal piece 2 further accurately.

In the foregoing, the present invention is not limited to measurement of acceleration, and can be applied to measurement of magnetic force, measurement of the degree of inclination of an object to be measured, measurement of flow speed of fluid, measurement of wind speed, and the like.

A structure example of the case of measuring magnetic force will be described. A film of magnetic material is formed on the portion between the movable electrode 5 and the excitation electrode 41 on the crystal piece 2, and the crystal piece 2 is structured to bend when this magnetic material is located in a magnetic field.

Further, regarding measurement of the degree of inclination of the object to be measured, the base supporting the crystal piece 2 or 2A, 2B is inclined at various angles in advance, and frequency information is obtained for each inclination angle, thereby enabling detection of an inclination angle from the frequency information when the base is installed on a surface to be measured.

Moreover, when the crystal piece 2 is exposed in fluid such as gas or liquid, flow speed can be detected via frequency information according to the bending amount of the crystal piece. In this case, the thickness of the crystal piece 2 is determined according to a measuring range of the flow speed, or the like. Furthermore, the present invention can be applied to the case of measuring gravity.

What is claimed is:

1. An external force detecting device detecting external force acting on a piezoelectric piece, the device comprising:
the piezoelectric piece as a cantilever piezoelectric piece supported at one end on a base;
one excitation electrode provided on a portion encompassing less than all of one face side of the piezoelectric piece, and another excitation electrode provided on a portion encompassing less than all of another face side of the piezoelectric piece facing said portion of said one face side, so as to vibrate said piezoelectric piece;
an oscillation circuit connected electrically to the one excitation electrode;
a movable electrode for forming a first part of a variable capacitor provided in a portion separated from said one end on the piezoelectric piece and connected electrically to the other excitation electrode;
a fixed electrode, for forming a second part of the variable capacitor, provided separately from the piezoelectric piece to face the movable electrode and connected to the oscillation circuit, where capacitance between the fixed electrode and the movable electrode is changed by bending of the piezoelectric piece to thereby form said variable capacitor; and
a frequency information detecting unit for detecting a signal as frequency information corresponding to an oscillation frequency of the oscillation circuit; and
wherein the movable electrode is provided at an end opposite said one end on said another face side of said piezoelectric piece;
wherein an oscillation loop is formed from the oscillation circuit, passing through the one excitation electrode, the other excitation electrode, the movable electrode, and the fixed electrode and returning to the oscillation circuit; and
wherein the frequency information detected by the frequency information detecting unit is for evaluating force acting on the piezoelectric piece.

2. The external force detecting device according to claim 1, wherein a first group and a second group are provided, each group being formed of the piezoelectric piece, the excitation electrodes, the movable electrode, and the fixed electrode, and the frequency information detecting unit obtains a signal corresponding to a difference between an oscillation frequency corresponding to the first group and an oscillation frequency corresponding to the second group.

3. The external force detecting device according to claim 1, wherein the piezoelectric piece is a detection piezoelectric piece, and the detection piezoelectric piece and a reference piezoelectric piece are provided in a common container;
wherein one excitation electrode and another excitation electrode are provided respectively on each one of two faces of the reference piezoelectric piece, and the one excitation electrode and the other excitation electrode are connected to the oscillation circuit so as to oscillate said reference piezoelectric piece; and
wherein the frequency information detecting unit is for obtaining a signal corresponding to a difference between an oscillation frequency corresponding to the detection piezoelectric piece and an oscillation frequency corresponding to the reference piezoelectric piece.

4. The external force detecting device according to claim 3, wherein the detection piezoelectric piece and the reference piezoelectric piece are combined and shared.

5. The external force detecting device according to claim 1, wherein the piezoelectric piece is a crystal piece and a crystal axis of a portion where the excitation electrodes are provided and a crystal axis of a portion where the movable electrode is provided are different from each other.

6. The external force detecting device according to claim 1, wherein a support part is provided on the base to support a portion between the excitation electrodes and the movable electrode on the piezoelectric piece, the portion being on a lower face of the piezoelectric piece, so as to prevent bending of the portion where the excitation electrodes are provided when external force is applied to the piezoelectric piece.

7. The external force detecting device according to claim 6, wherein a front end of the support part and the piezoelectric piece are fixed to each other.

8. The external force detecting device according to claim 1, further comprising on an internal wall part on a side where the fixed electrode is provided in the container, a projecting part allowing a contact of a portion shifted toward one end side from the other end side of the piezoelectric piece to restrict bending of this portion when the piezoelectric piece bends excessively, thereby avoiding collision of the other end of the piezoelectric piece with the inner wall part of the container.

9. The external force detecting device according to claim 8, wherein with respect to a face of the projecting part which faces the piezoelectric piece, a vertical cross-sectional shape in a length direction of the piezoelectric piece is a mound shape.

10. The external force detecting device according to claim 1, wherein said one excitation electrode occupies less than an entire area of said one face side of the piezoelectric element, wherein said another excitation electrode occupies less than an entire area of said another face side of the piezoelectric element, wherein said another excitation electrode is situated on said another face side at a location corresponding to where said one excitation electrode is situated on said one face side;
  wherein said movable electrode occupies less than said entire area of said another face side of the piezoelectric element and is spaced from said another excitation electrode on said another face side of the piezoelectric element at said end opposite said one end; and
  wherein a lead-out electrode connects the movable electrode to said another excitation electrode, said lead-out electrode having a different width along said another face side than a width of said another excitation electrode and a width of said movable electrode, thereby distinguishing the lead-out electrode from the another excitation electrode and the moveable electrode.

11. The external force detecting device according to claim 1, wherein the movable electrode is structurally distinct from said another excitation electrode to which the movable electrode is connected by a band electrode, and wherein the movable electrode, and not any portion of said another excitation electrode, aligns with said fixed electrode throughout any bending motion of the piezoelectric piece so that the variable capacitor comprises: a first plate formed by the movable electrode and excluding said another excitation electrode; and a second plate formed by said fixed electrode.

12. An external force detecting sensor for detecting external force acting on a piezoelectric piece based on an oscillation frequency of the piezoelectric piece, the sensor comprising:
  the piezoelectric piece having a cantilever configuration so as to be supported at one end on a base;
  one excitation electrode provided on a portion encompassing less than all of one face side of the piezoelectric piece and connected electrically to an oscillation circuit so as to vibrate this piezoelectric piece;
  another excitation electrode provided on another face side of the piezoelectric piece facing said portion of said one face side;
  a movable electrode for forming a first part of a variable capacitor provided in a portion separated from said one end on the piezoelectric piece and being connected electrically to the other excitation electrode; and
  a fixed electrode, for forming a second part of the variable capacitor, provided separately from the piezoelectric piece to face the movable electrode, the fixed electrode being connected to the oscillation circuit; and
  wherein capacitance between the fixed electrode and the movable electrode is changed by bending of the piezoelectric piece to thereby form said variable capacitor; and
  wherein the movable electrode is provided at an end opposite said one end on said another face side of said piezoelectric piece.

13. The external force detecting sensor according to claim 12, wherein said one excitation electrode occupies less than an entire area of said one face side of the piezoelectric element, wherein said another excitation electrode occupies less than an entire area of said another face side of the piezoelectric element, wherein said another excitation electrode is situated on said another face side at a location corresponding to where said one excitation electrode is situated on said one face side;
  wherein said movable electrode occupies less than said entire area of said another face side of the piezoelectric element and is spaced from said another excitation electrode on said another face side of the piezoelectric element at said end opposite said one end; and
  wherein a lead-out electrode connects the movable electrode to said another excitation electrode, said lead-out electrode having a different width along said another face side than a width of said another excitation electrode and a width of said movable electrode, thereby distinguishing the lead-out electrode from the another excitation electrode and the moveable electrode.

14. The external force detecting sensor according to claim 12, wherein the movable electrode is structurally distinct from said another excitation electrode to which the movable electrode is connected by a band electrode, and wherein the movable electrode, and not any portion of said another excitation electrode, aligns with said fixed electrode throughout any bending motion of the piezoelectric piece so that the variable capacitor comprises: a first plate formed by the movable electrode and excluding said another excitation electrode; and a second plate formed by said fixed electrode.

* * * * *